US012088862B2

(12) United States Patent
Maze et al.

(10) Patent No.: US 12,088,862 B2
(45) Date of Patent: Sep. 10, 2024

(54) METHOD, DEVICE, AND COMPUTER PROGRAM FOR TRANSMITTING MEDIA CONTENT

(71) Applicant: CANON KABUSHIKI KAISHA, Tokyo (JP)

(72) Inventors: Frédéric Maze, Langan (FR); Franck Denoual, Saint Domineuc (FR); Naël Ouedraogo, Val d'Anast (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/734,393

(22) PCT Filed: Jun. 5, 2019

(86) PCT No.: PCT/EP2019/064691
§ 371 (c)(1),
(2) Date: Dec. 2, 2020

(87) PCT Pub. No.: WO2019/234116
PCT Pub. Date: Dec. 12, 2019

(65) Prior Publication Data
US 2021/0176509 A1    Jun. 10, 2021

(30) Foreign Application Priority Data

Jun. 6, 2018    (GB) .................................. 1809331

(51) Int. Cl.
*H04N 21/2343*    (2011.01)
*H04N 19/597*     (2014.01)
(Continued)

(52) U.S. Cl.
CPC ... *H04N 21/234327* (2013.01); *H04N 19/597* (2014.11); *H04N 21/234345* (2013.01); *H04N 21/2353* (2013.01); *H04N 21/85406* (2013.01)

(58) Field of Classification Search
CPC ... H04N 21/234327; H04N 21/234345; H04N 21/2353; H04N 21/85406
See application file for complete search history.

(56) References Cited

U.S. PATENT DOCUMENTS

| 2016/0057491 | A1* | 2/2016 | Ueda | H04N 21/8541 |
| | | | | 713/193 |
| 2019/0320190 | A1* | 10/2019 | Wang | H04N 23/698 |
| 2019/0373245 | A1* | 12/2019 | Lee | H04N 21/8456 |

FOREIGN PATENT DOCUMENTS

| CN | 103026721 A | 4/2013 |
| CN | 107750462 A | 3/2018 |

(Continued)

OTHER PUBLICATIONS

WD 1 of ISO/IEC 23090-2 OMAF 2nd edition, MPEG Meeting, Motion Picture Expert Group or ISO/IEC JTC1/SC29/WG11, Apr. 16-20, 2018, 191 pages, Doc. No. N17584, May 5, 2018, San Diego, US, XP030024211.

(Continued)

*Primary Examiner* — Joshua D Taylor
(74) *Attorney, Agent, or Firm* — Canon U.S.A., Inc. IP Division

(57) ABSTRACT

A method for encapsulating encoded media data corresponding to a wide view of a scene, the method comprising: obtaining a projected picture from the wide view of the scene;
splitting the projected picture into at least one sub-picture; encoding the at least one sub-picture into a plurality of tracks;
generating descriptive metadata associated with the encoded tracks, the descriptive metadata comprise a first information associated with each track being indicative of a spatial relationship between the at least one sub-picture encoded in the track and a reference picture;

(Continued)

wherein the descriptive metadata further comprises a second information indicating the reference picture.

15 Claims, 11 Drawing Sheets

(51) Int. Cl.
*H04N 21/235* (2011.01)
*H04N 21/854* (2011.01)

(56) References Cited

FOREIGN PATENT DOCUMENTS

| WO | 2017/200721 A1 | 11/2017 |
|---|---|---|
| WO | 2018/038523 A1 | 3/2018 |
| WO | 2018/045108 A1 | 3/2018 |

OTHER PUBLICATIONS

Franck Denoual, et al., On Coverage Information Description in OMAF, MPEG Meeting #119, Jul. 17-21, 2017, Motion Picture Expert Group or ISO/IEC JTC1/SC29/WG11, Jul. 10, 2017, 5 pages, Torino, IT, Doc. No. m41052, XP030069395.

Text of ISO/IEC 14496-12, 6th edition, Information technology—Coding of audio-visual objects—Part 12: ISO base media file format, Amendment 1, MPEG Meeting, Motion Picture Expert Group or ISO/IEC JTC1/SC29/WG11, Apr. 16-20, 2018, 24 pages, San Diego, CA, XP030024171.

Franck Denoual, et al., On OMAF Viewport-dependent profile, MPEG Meeting #119, Jul. 17-21, 2017, Motion Picture Expert Group or ISO/IEC JTC1/SC29/WG11, Jul. 10, 2017, 4 pages, Torino, IT, Doc. No. m41053, XP030069396.

Frank Denoual, et al., [OMAF] Additional indications for sub-picture tracks, International Organisation for Standardisation, ISO/IEC JTC1/SC29/WG11, Coding of Moving Pictures and Audio, Jul. 2018, Ljubljana, SL, Doc. No. M43420.

\* cited by examiner

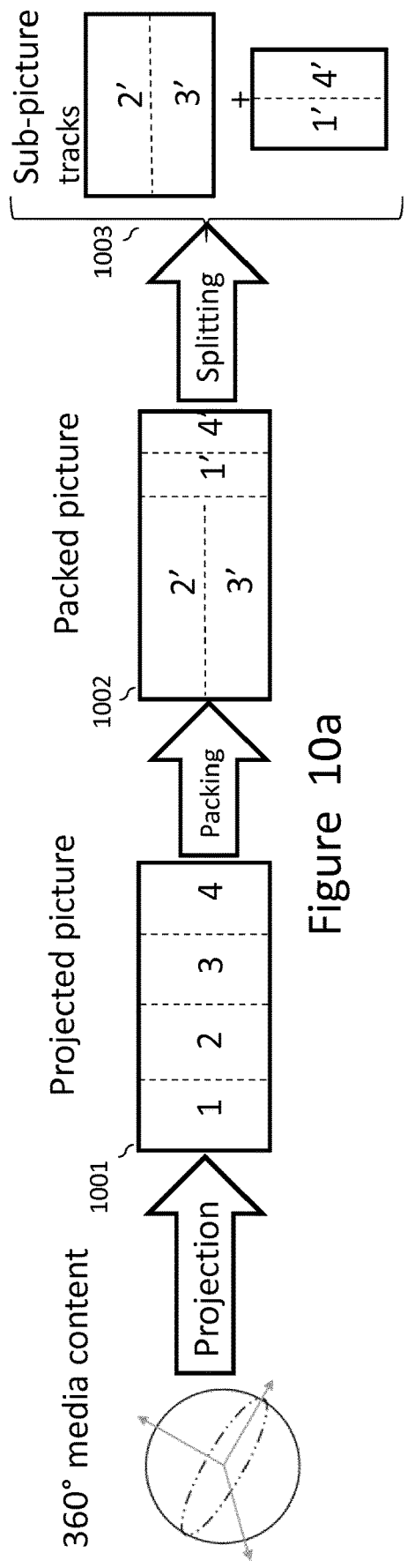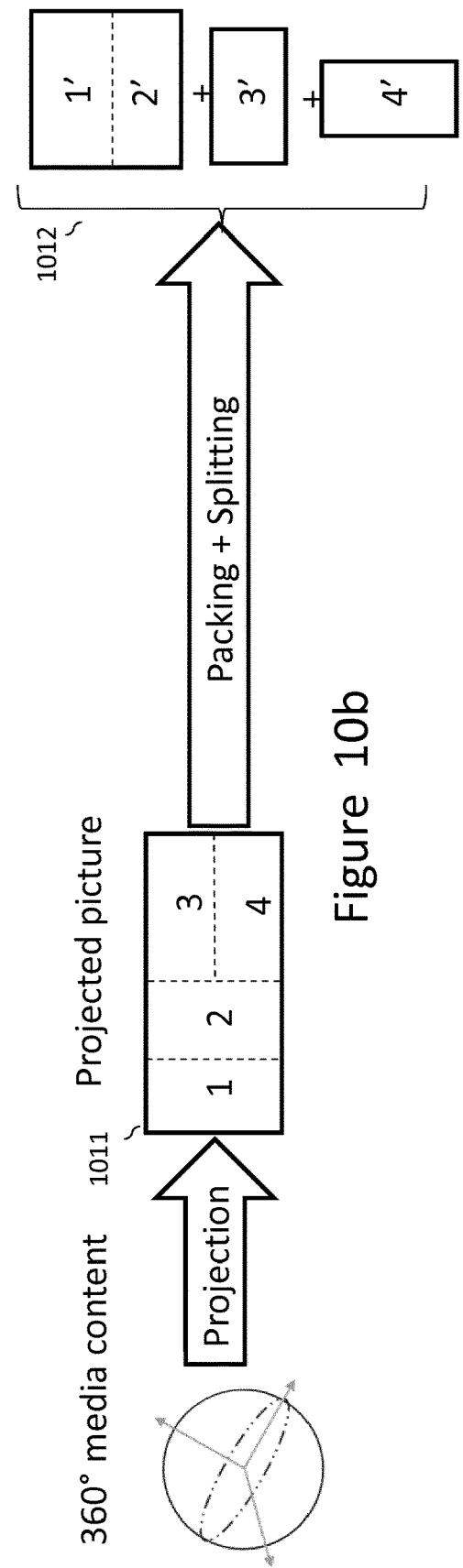
Figure 10a
Figure 10b

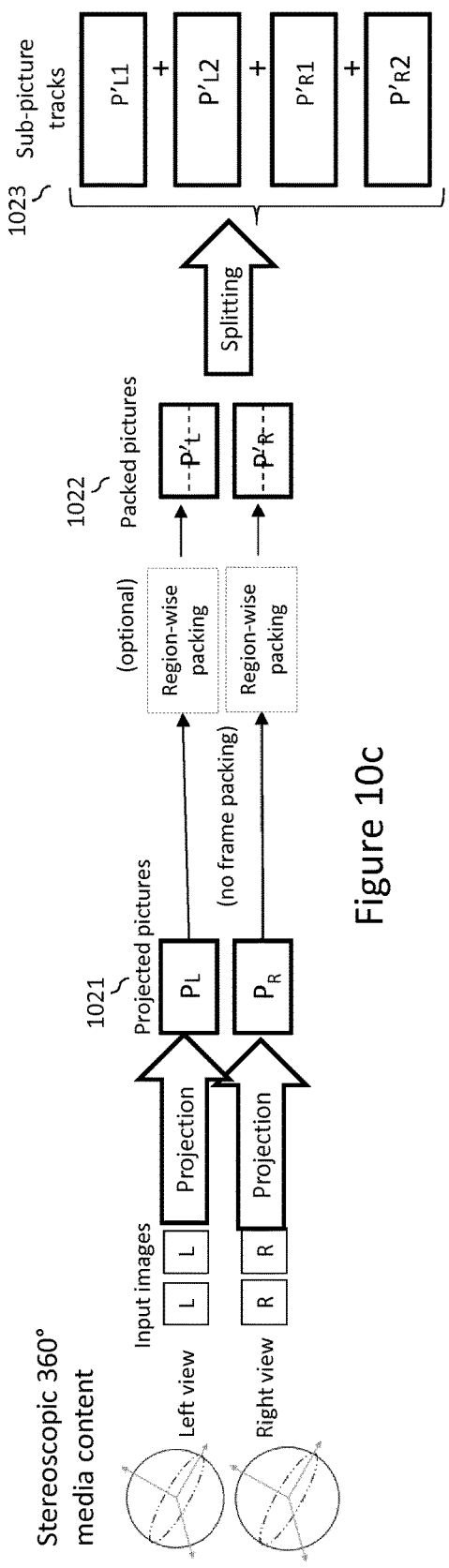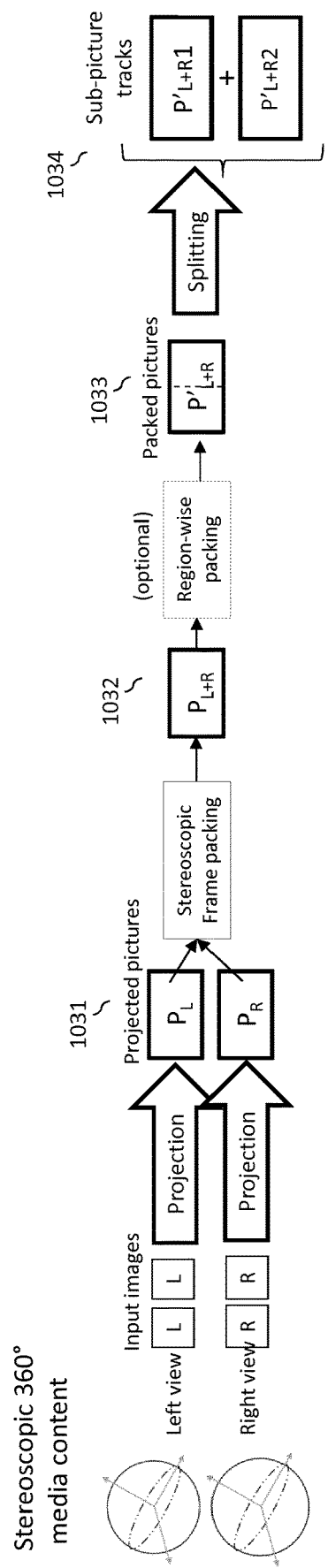

METHOD, DEVICE, AND COMPUTER PROGRAM FOR TRANSMITTING MEDIA CONTENT

CROSS-REFERENCE TO RELATED APPLICATIONS

This application is the National Phase application of PCT Application No. PCT/EP2019/064691, filed on Jun. 5, 2019 and entitled "METHOD, DEVICE, AND COMPUTER PROGRAM FOR TRANSMITTING MEDIA CONTENT". This application claims the benefit under 35 U.S.C. § 119(a)-(d) of United Kingdom Patent Application No. 1809331.0, filed on Jun. 6, 2018. The above cited patent applications are incorporated herein by reference in their entireties.

FIELD OF THE INVENTION

The present invention relates to methods and devices for encapsulating and transmitting media data.

BACKGROUND OF THE INVENTION

The invention is related to encapsulating, parsing and streaming virtual reality media content, e.g. according to ISO Base Media File Format as defined by the MPEG standardization organization, to provide a flexible and extensible format that facilitates interchange, management, editing, and presentation of virtual reality media content and to improve its delivery for example over an IP network such as Internet using adaptive http streaming protocol.

The International Standard Organization Base Media File Format (ISO BMFF, ISO/IEC 14496-12) is a well-known flexible and extensible format that describes encoded timed media data bit-streams either for local storage or transmission via a network or via another bit-stream delivery mechanism. An example of extensions is ISO/IEC 14496-15 that describes encapsulation tools for various NAL (Network Abstraction Layer) unit based video encoding formats. Examples of such encoding formats are AVC (Advanced Video Coding), SVC (Scalable Video Coding), HEVC (High Efficiency Video Coding), and L-HEVC (Layered HEVC). Another example of file format extensions is ISO/IEC 23008-12 that describes encapsulation tools for still images or sequence of still images such as HEVC Still Image. This file format is object-oriented. It is composed of building blocks called boxes (or data structures characterized by a four characters code) that are sequentially or hierarchically organized and that define parameters of the encoded timed media data bit-stream such as timing and structure parameters. In the file format, the overall presentation is called a movie. The movie is described by a movie box (with the four character code 'moov') at the top level of the media or presentation file. This movie box represents an initialization information container containing a set of various boxes describing the presentation. It is logically divided into tracks represented by track boxes (with the four character code 'trak'). Each track (uniquely identified by a track identifier (track_ID)) represents a timed sequence of media data belonging to the presentation (frames of video, for example). Within each track, each timed unit of data is called a sample; this might be a frame of video, audio or timed metadata. Samples are implicitly numbered in sequence. The actual sample data are stored in boxes called Media Data Boxes (with the four character code 'mdat') at the same level as the movie box. The movie can be organized temporally as a movie box containing information for the whole presentation followed by a list of couple movie fragment and Media Data boxes. Within a movie fragment (box with the four character code 'moof') there is a set of track fragments (box with the four character code 'traf'), zero or more per movie fragment. The track fragments in turn contain zero or more track run boxes ('trun'), each of which document a contiguous run of samples for that track fragment.

In the file format, a media or presentation file may also contain one or more static items (e.g. one or more still images) described within a meta box ('meta') at same level as the movie box. This meta box may contain descriptive information describing static items, this descriptive information being organized in several boxes (for instance, the list of items in an item information box ('iinf') and the location (in data boxes) of data items in an item location box ('iloc')), each item being uniquely identified by an item identifier (item_ID). The actual item data are stored either in an item data box ('idat') in the meta box or in a media data box ('mdat') at file top level.

An ISOBMFF file may contain multiple encoded timed media data bit-streams or sub-parts of encoded timed media data bit-streams forming multiple tracks (also noted sub-picture tracks for video content) and/or multiple static items. ISOBMFF and its extensions comprise several grouping mechanisms to group together tracks, static items, or samples. A group typically shares common semantic and/or characteristics.

For instance, ISOBMFF comprises an entity group mechanism, a track group mechanism, and a sample grouping mechanism. The entity grouping mechanism can be used to indicate that tracks and/or static items are grouped according to an indicated grouping type or semantic. The track grouping mechanism can be used to indicate that tracks are grouped according to an indicated grouping type or semantic. The sample grouping mechanism can be used to indicate that certain properties associated with an indicated grouping type or semantic apply to an indicated group of samples within a track.

To improve user experience and in particular to offer immersive experience, timed media data bit-streams (videos and even audio) may be omnidirectional (or multi-directional or pluri-directional). When applied to videos, also known as 360° panoramic video, the user feels to be located in the scene that is displayed.

An omnidirectional video may be obtained from a 360° camera and/or by combining images of video streams obtained from several cameras, for example mounted on a special rig so that all the cameras have a common nodal point. Such a combination of images is known as image stitching or camera stitching.

Such an omnidirectional video may be rendered via head mounted displays according to the user's viewing orientation or through projection onto a curved screen surrounding users. It may also be displayed on traditional 2D screens with navigation user interface to pan into the omnidirectional video according to user's desired part of the omnidirectional video (also known as viewport). It is often referred to as virtual reality (VR) since the user feels to be in a virtual world. When virtual objects are added to the omnidirectional video, it is referred to as augmented reality (AR).

The inventors have noticed several problems when describing and signaling information about the media data to transmit, in particular when omnidirectional media content is split into several sub-parts carried by multiple tracks.

An example involves the signaling of tracks requesting a specific parsing process from the client, which generates overhead and is complex.

Another example concerns the signaling of group of tracks and in particular the mapping between original omnidirectional media content and two dimensions (2D) media contents (either projected, packed or fisheye coded) embedded into multiple sub-picture tracks.

Another example involves the signaling of the sub-picture tracks that are allowed or not to be combined to rebuild an omnidirectional media content ready for display. The existing solutions are either complex or not well defined and not fully compliant with existing mechanisms for two dimensional multi-tracks encapsulation process.

SUMMARY OF THE INVENTION

The present invention has been devised to address one or more of the foregoing concerns.

In this context, there is provided a solution for streaming media content (for example omnidirectional media content), for example over an IP network such as Internet using the http protocol.

According to a first aspect of the invention there is provided a method for encapsulating encoded media data corresponding to a wide view of a scene, the method comprising:
obtaining a projected picture from the wide view of the scene;
packing the obtained projected picture in at least one packed picture;
splitting the at least one packed picture into at least one sub-picture;
encoding the at least one sub-picture into a plurality of tracks;
generating descriptive metadata associated the encoded tracks,
wherein the descriptive metadata comprise an item of information associated with each track being indicative of a spatial relationship between the at least one sub-picture encoded in the track and the at least one projected picture.

According to another aspect of the invention there is provided a method for encapsulating encoded media data corresponding to a wide view of a scene, the method comprising:
obtaining a projected picture from the wide view of the scene;
splitting the projected picture into at least one sub-picture;
encoding the at least one sub-picture into a plurality of tracks;
generating descriptive metadata associated with the encoded tracks, the descriptive metadata comprise a first item of information associated with each track being indicative of a spatial relationship between the at least one sub-picture encoded in the track and a reference picture;
wherein the descriptive metadata further comprises a second item of information indicating the reference picture.

According to embodiments, splitting the projected picture into a plurality of sub-pictures comprises packing the projected picture into a packed picture and splitting the packed picture into a plurality of sub-pictures.

According to embodiments, the second item of information is a brand value indicating that the reference picture is the projected picture.

According to embodiments, the second item of information is a brand value indicating that the reference picture is the packed picture.

According to embodiments, the second item of information is comprised in the first item of information associated with each track.

According to embodiments, the second item of information is defined as a parameter of the first item of information.

According to embodiments, the presence of the parameter is indicated by a flag provided to the first item of information.

According to embodiments, the second item of information is defined as a flag provided to the first item of information.

According to embodiments, the second item of information is defined as a specific type of group information used to describe the properties of a group of tracks corresponding to sub-pictures.

According to another aspect of the invention there is provided a method for generating at least one image from a media file comprising a plurality of encoded tracks and associated descriptive metadata, the method comprising:
determining that the plurality of encoded tracks comprise a group of tracks encoding at least one sub-picture resulting from the splitting of a packed picture obtained by packing a projected picture of a wide view of a scene;
parsing descriptive metadata associated with the group of tracks;
wherein parsing descriptive metadata associated with the group of tracks comprises:
interpreting an item of information associated with each track being indicative of a spatial relationship between the at least one sub-picture encoded in the track and the at least one projected picture.

According to another aspect of the invention there is provided a method for generating at least one image from a media file comprising a plurality of encoded tracks and associated descriptive metadata, the method comprising:
determining that the plurality of encoded tracks comprise a group of tracks encoding at least one sub-picture resulting from the splitting of a projected picture of a wide view of a scene;
parsing descriptive metadata associated with the group of tracks;
wherein parsing descriptive metadata associated with the group of tracks comprises:
interpreting a first item of information associated with each track being indicative of a spatial relationship between the at least one sub-picture encoded in the track and the at least one reference picture; and
interpreting a second item of information indicating the reference picture.

According to embodiments, the splitting of a projected picture of a wide view of a scene is obtained by splitting a packed picture obtained by packing the projected image.

According to embodiments, the second item of information is a brand value indicating that the reference picture is the projected picture.

According to embodiments, the second item of information is a brand value indicating that the reference picture is the packed picture.

According to embodiments, the second item of information is comprised in the first item of information associated with each track.

According to embodiments, the second item of information is defined as a parameter of the first item of information.

According to embodiments, the presence of the parameter is indicated by a flag provided to the first item of information.

According to embodiments, the second item of information is defined as a flag provided to the first item of information.

According to embodiments, the second item of information is defined as a specific type of group information used to describe the properties of a group of tracks corresponding to sub-pictures.

According to another aspect of the invention there is provided a computing device for encapsulating encoded media data corresponding to a wide view of a scene, the computing device being configured for:
- obtaining a projected picture from the wide view of the scene;
- packing the obtained projected picture in at least one packed picture;
- splitting the at least one packed picture into at least one sub-picture;
- encoding the at least one sub-picture into a plurality of tracks;
- generating descriptive metadata associated the encoded tracks, wherein the descriptive metadata comprise an item of information associated with each track being indicative of a spatial relationship between the at least one sub-picture encoded in the track and the at least one projected picture.

According to another aspect of the invention there is provided a computing device for encapsulating encoded media data corresponding to a wide view of a scene, the computing device being configured for:
- obtaining a projected picture from the wide view of the scene;
- splitting the projected picture into at least one sub-picture;
- encoding the at least one sub-picture into a plurality of tracks;
- generating descriptive metadata associated with the encoded tracks, the descriptive metadata comprise a first item of information associated with each track being indicative of a spatial relationship between the at least one sub-picture encoded in the track and a reference picture;
- wherein the descriptive metadata further comprises a second item of information indicating the reference picture.

According to another aspect of the invention there is provided a computing device for generating at least one image from a media file comprising a plurality of encoded tracks and associated descriptive metadata, the computing device being configured for:
- determining that the plurality of encoded tracks comprise a group of tracks encoding at least one sub-picture resulting from the splitting of a packed picture obtained by packing a projected picture of a wide view of a scene;
- parsing descriptive metadata associated with the group of tracks;
- wherein parsing descriptive metadata associated with the group of tracks comprises:
  interpreting an item of information associated with each track being indicative of a spatial relationship between the at least one sub-picture encoded in the track and the at least one projected picture.

According to another aspect of the invention there is provided a computing device for generating at least one image from a media file comprising a plurality of encoded tracks and associated descriptive metadata, the computing device being configured for:
- determining that the plurality of encoded tracks comprise a group of tracks encoding at least one sub-picture resulting from the splitting of a projected picture of a wide view of a scene;
- parsing descriptive metadata associated with the group of tracks;
- wherein parsing descriptive metadata associated with the group of tracks comprises:
  interpreting a first item of information associated with each track being indicative of a spatial relationship between the at least one sub-picture encoded in the track and the at least one reference picture; and
  interpreting a second item of information indicating the reference picture.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention are described below, by way of examples only, and with reference to the following drawings in which:

FIGS. 10a, 10b, 10c and 10d illustrate the several example of the overall process of projection, optional packing and splitting into sub-picture tracks according to embodiments of the invention.

DETAILED DESCRIPTION OF EMBODIMENTS OF THE INVENTION

Figure 1:
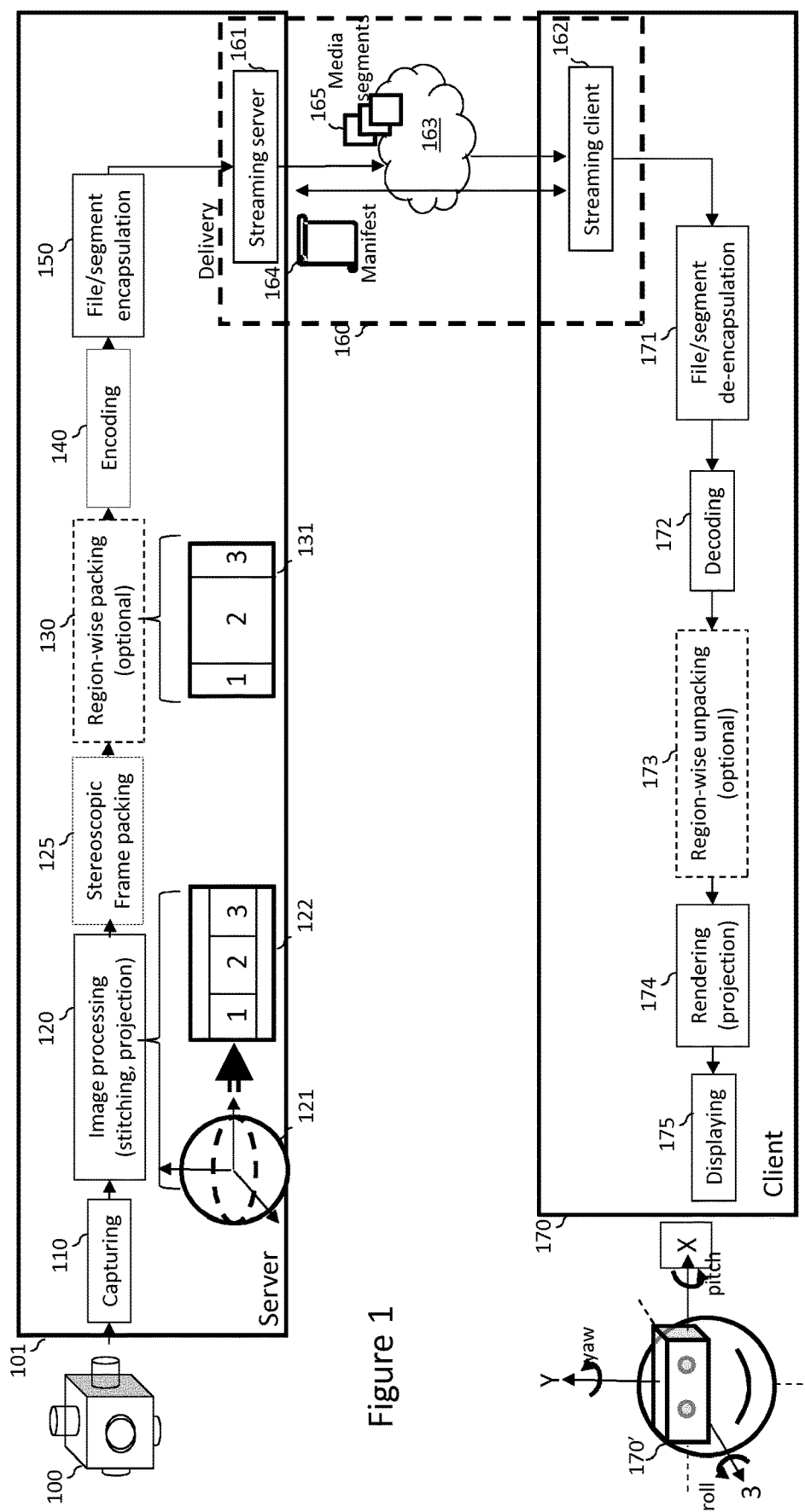
FIG. 1 illustrates an example of a data flow for capturing, processing, encapsulating, transmitting, and rendering an omnidirectional video from a server to a client.

FIG. 1 illustrates an example of data flow for capturing, transmitting, and rendering an omnidirectional media from a server device 101 to a client device 170 (also illustrated as 170').

As illustrated, this media has a video content acquired from camera system 100 and delivered to head-mounted display (HMD) 170 and 170'. The camera system 100 may contain one camera with a wide angle lens or a set of multiple cameras assembled together (for example a camera rig for virtual reality). The delivery 160 may be performed for example over an IP network 163 such as Internet using an adaptive http streaming protocol via the streaming server 161 and the streaming client 162.

For the sake of illustration, the used camera system 100 is based on a set of six standard cameras, associated with each face of a cube. It is used to capture (step 110) images representing the real scene surrounding the camera system. According to this arrangement, one camera provides front images, one camera provides rear images, one camera provides left images, one camera provides right images, one camera provides bottom images, and one camera provides top images.

The images obtained from camera system 100 are processed (step 120) in server 101 to create 360 images forming an omnidirectional video stream also called a 360 video stream or a virtual reality media data stream.

The processing step 120 consists in stitching and projecting captured images of the same time instance. Images are first stitched and projected onto a three-dimensional projection structure representing a sphere 121 forming a 360° view in both horizontal and vertical dimensions. The 360 image data on the projection structure is further converted onto a two-dimensional projected image 122 (also denoted a capturing projection), for example using an equirectangular projection (https://en.wikipedia.org/wiki/Equirectangular_projection). The projected image covers the entire sphere.

Alternatively, if the omnidirectional media is a stereoscopic 360-degree video, the camera system 100 may be composed of multiple cameras capturing at step 110 image sequences representing a left view and a right view that can be used later on by the client to render a three-dimensional 360-degree scene. In such a case, the processing step 120 described above is applied on both left-view and right-view images sequences separately. Optionally, at step 125, frame packing may be applied to pack each left view image and right view image of the same time instance onto a same projected image resulting on one single left+right projected images sequence. Several stereoscopic frame packing arrangements are possible, for instance, side-by-side, top-bottom, column based interleaving, row based interleaving, temporal interleaving of alternating left and right views. Alternatively, a stereoscopic frame packing arrangement may also consist in keeping left and right views in separate and independent projected images sequence resulting in independent video bit-streams after the encoding step 140. For example, one video bit-stream represents the left view images and the other one does the right view images.

Optionally, region-wise packing 130 is then applied to map the projected image 122 onto a packed image 131. Region-wise packing consists in applying transformation (e.g. rotation, mirroring, copy or move of pixel blocks . . . ), resizing, and relocating of regions of a projected image in order for instance to maximize signal information on the most useful parts of the sphere for the user. It can be noted that the packed image may cover only a part of the entire sphere. If the region-wise packing is not applied, the packed image 131 is identical to the projected image 122. In case of stereoscopic omnidirectional media, region-wise packing applies either on the left+right projected images sequence, or separately on the left-view and right-view projected images sequences depending on the frame packing arrangement chosen at step 125.

The projected images 122 or packed images 131 are encoded at step 140 into one or several video bit-streams. In case of stereoscopic omnidirectional media, encoding step applies either on the left+right packed images sequence, or separately on the left-view and right-view packed images sequences depending on the frame packing arrangement chosen at step 125. Alternatively, Multi-View encoding can be used on the left-view and right-view packed images sequences.

Examples of encoding formats are AVC (Advanced Video Coding), SVC (Scalable Video Coding), HEVC (High Efficiency Video Coding) or L-HEVC (Layered HEVC). In the following, HEVC is used to refer to both HEVC and to its layered extensions (L-HEVC).

HEVC and similar video encoding formats define different spatial subdivisions of samples, e.g. pictures: tiles, slices and slice segments. A tile defines a rectangular region of a picture that is defined by horizontal and vertical boundaries (i.e., rows and columns) and that contains an integer number of Coding Tree Units (CTUs) or coding blocks, all referred to hereinafter coding units. As such, tiles are good candidates to represent spatial sub-parts of a picture. However, coded video data (bit-stream) organization in terms of syntax and its encapsulation into NAL units (or NALUs) is rather based on slices and slice segments (as in AVC).

A slice in HEVC is a set of slice segments, with at least the first slice segment being an independent slice segment, the others, if any, being dependent slice segments. A slice segment contains an integer number of consecutive (in raster scan order) CTUs. The slice does not necessarily have a rectangular shape (it is thus less appropriate than tiles for spatial sub-part representations). A slice segment is encoded in the HEVC bit-stream as a slice_segment_header followed by slice_segment_data. Independent slice segments (ISS) and dependent slice segments (DSS) differ by their header: the dependent slice segment has a shorter header because reusing information from the independent slice segment's header. Both independent and dependent slice segments contain a list of entry points in the bit-stream.

When a video bit-stream is encoded with tiles, tiles can be motion-constrained to ensure that tiles do not depend from neighborhood tiles in the same picture (spatial dependency) and from neighborhood tiles in previous reference pictures (temporal dependency). Thus, motion-constrained tiles are independently decodable.

Alternatively, the projected image 122 or packed image 131 can be split into several spatial sub-pictures before encoding, each sub-picture being encoded independently forming for instance an independent encoded HEVC bit-stream.

Alternatively, the region-wise packing step 130 and the splitting into several spatial sub-pictures step can be conducted simultaneously without generating in memory the complete intermediate packed image 131. The projected image 122 (or the resulting stereoscopic projected image after the optional step 125) can be split into sub parts and each sub part can be directly packed into a spatial sub-picture to be encoded at step 140.

FIGS. 10*a*, 10*b*, 10*c* and 10*d* illustrate the several example of the overall process of projection, optional packing and splitting into sub-picture tracks according to embodiments of the invention. One or more regions from the projected picture 1001 (noted 1, 2, 3 and 4) are rearranged into packed regions 1002 (noted 1', 2', 3' and 4') by applying several transform operations (identity, up or down scaling, rotation, mirroring, relocation . . . ) and then split and reorganized into one or more sub-picture tracks 1003. The splitting may also lead to one sub-picture track per packed region (1', 2', 3' or 4'). Packing and splitting operations may also be conducted at once, directly from the projected picture 1011 to one or more sub-picture tracks 1012. FIGS. 10c and 10d provide examples of different possible encapsulation in case the omnidirectional content is stereo content. In such case, the capturing step 110 uses a camera rig allowing stereoscopic recording, typically one video per eye.

FIG. 10c depicts an example of stereoscopic omnidirectional content where there is no frame packing (optional step 125 on FIG. 1). Then, each projected view 1021 is independently encapsulated, possibly into multiple sub-picture tracks like 1023 when region-wise packing is applied to each view (in 1022). In this example, there is one sub-picture track per region of each view. One could even decide to encapsulate both views of a same region in the same sub-picture track. Then the sub-picture track would contain a stereo video box at sample description level indicating the frame packing used.

FIG. 10d depicts an example of stereoscopic omnidirectional content where there is a frame packing (step 125 on FIG. 1) applied in order to pack the two projected views 1031 in a single frame-packed picture 1032. Then, the resulting frame-packed picture 1032 is encapsulated, possibly into multiple sub-picture tracks like in 1033. In this example, each sub-picture track describes both views for a given spatial region. As for the projection followed by packing, one sub-picture track may encapsulate one region or many regions (as depicted on FIG. 10). An encapsulation module may decide on a description cost versus access granularity trade-off to encapsulate the content into sub-picture tracks containing multiple packed regions for example. This may be the case when the encapsulation by computing inverse projection of the packed region finds that there is no gap in the inverse projection of contiguous regions in the packed frame. This may be a decision criterion to group these regions from the packed picture into a single sub-picture track. FIGS. 10a, 10b, 10c and 10d illustrates such gathering of several regions in a same sub-picture track. In case, the encapsulation module gathers multiple regions in a sub-picture track that generate gaps, holes or uncovered pixels in the projected picture, it may set the sub picture track positions and sizes equal to the positions and sizes of the bounding box of these multiple regions.

Therefore, as result of the encoding step 140, the projected image 122 or packed image 131 can be represented by one or more independent encoded bit-streams or by at least one encoded bit-stream composed of one or more independently encoded sub-bit-streams.

Those encoded bit-streams and sub-bit-streams are then encapsulated at step 150 in a file or in small temporal segment files 165 according to an encapsulation file format, for instance according to ISO Base Media File Format and Omnidirectional MediA Format (OMAF-ISO/IEC 23090-2) as defined by the MPEG standardization organization. The resulting file or segment files can be mp4 file or mp4 segments. During the encapsulation, audio stream may be added to the video bit-stream as well as metadata tracks providing information on the video or on the audio streams.

The encapsulated file or segment files are then delivered to client 170 via a delivery mechanism 160, for example over Internet using http (HyperText Transfer Protocol) protocol or on a removable digital medium such as for example a disk. For the sake of illustration, the delivery 160 is performed using an adaptive streaming over HTTP such as DASH (Dynamic Adaptive Streaming over HTTP) from the MPEG standardization committee ("ISO/IEC 23009-1, Dynamic adaptive streaming over HTTP (DASH), Part1: Media presentation description and segment formats").

This standard enables association of a compact description of the media content of a media presentation with HTTP Uniform Resource Locations (URLs). Such an association is typically described in a file called a manifest file or a description file 164. In the context of DASH, this manifest file is an XML file also called the MPD file (Media Presentation Description).

By receiving an MPD file, a client device 170 gets the description of each media content component. Accordingly, it is aware of the kind of media content components proposed in the media presentation and knows the HTTP URLs to be used for downloading, via the streaming client 162, the associated media segments 165 from the streaming server 161. Therefore, the client 170 can decide which media content components to download (via HTTP requests) and to play (i.e. to decode and to play after reception of the media segments).

It is to be noted that the client device can only get media segments corresponding to a spatial part of full packed images representing a wide view of the scene depending on the user's viewport (i.e. part of the spherical video that is currently displayed and viewed by the user). The wide view of the scene may represent the full view represented by the full packed image.

Upon reception, the encapsulated virtual reality media file or media segments are parsed during step 171 so as to extract one or more data streams that is/are decoded at step 172. In case of ISOBMFF file or segments received at step 171, the parsing is typically handled by an mp4 reader or mp4 parser that, from the descriptive metadata, can extract encapsulated video bit-streams and/or video sub-bit-streams.

Next, optionally at step 173, the packed images or packed sub-images resulting from the decoding step 172 are unpacked to obtain the projected images that are then processed for video rendering (step 174) and displayed (step 175).

Alternatively packed sub-images may be rearranged to compose intermediate full packed images before being unpacked into projected pictures.

It is to be noted that video rendering depends on several parameters among which is the point of view of the user, the point of sight, and the projection(s) used to create the projected images. As illustrated, rendering the video comprises a step of re-projecting on a sphere the decoded projected images. The images obtained from such a re-projection are displayed in the Head-Mounted display 170'.

For handling stereoscopic views, the process described by reference to FIG. 1 may be duplicated or partially duplicated.

It has been observed that stitching several images of UHD (Ultra High Definition) video streams into panorama images of a virtual reality media data stream leads to a very high bitrate and very high resolution virtual reality media data stream. Therefore, from a system's perspective and to avoid wasting bandwidth and to remain compliant with processing capabilities of the client players, there is a need to optimize access to the virtual reality media data.

Such a need is even more important that a virtual reality media data stream may be used for other purposes than the one described by reference to FIG. 1. In particular, a virtual reality media data stream can be used for displaying 360° images with specific displays like a 360° array of projectors. It can also be used to display particular field of view and/or change the point of view, the field of view, and the point of sight.

According to particular embodiments, encoded bit-streams and sub-bit-streams resulting from the encoding of a packed image 131 (step 140 of FIG. 1) are encapsulated into a file or into small temporal segment files according to an encapsulation file format, for instance ISO Base Media File Format (ISO/IEC 14496-12 and ISO/IEC 14496-15), Omnidirectional MediA Format (OMAF) (ISO/IEC 23090-2) and associated specifications as defined by the MPEG standardization organization.

An encoded bit-stream (e.g. HEVC) and possibly its sub-bit-streams (e.g. tiled HEVC, MV-HEVC, scalable HEVC), can be encapsulated as one single track. Alternatively multiple encoded bit-streams that are spatially related (i.e. are sub-spatial parts of a projected image) can be encapsulated as several sub-picture tracks. Alternatively, an encoded bit-stream (e.g. tiled HEVC, MV-HEVC, scalable HEVC) comprising several sub-bit-streams (tiles, views, layers) can be encapsulated as multiple sub-picture tracks.

A sub-picture track is a track embedding data for a sub-part, typically a spatial part or rectangular region, of a picture or image. A sub-picture track may be related to other sub-picture tracks or to the track describing the full picture the sub-picture is extracted from. For example a sub-picture track can be a tile track. It can be represented by an AVC track, an HEVC track, an HEVC tile track or any compressed video bit-stream encapsulated as a sequence of samples.

A tile track is a sequence of timed video samples corresponding to a spatial part of an image or to a sub-picture of an image or picture. It can be for example a region of interest in an image or an arbitrary region in the image. The data corresponding to a tile track can come from a video bit-stream or can come from a sub part of a video bit-stream. For example a tile track can be an AVC or HEVC compliant bit-stream or can be a sub-part of AVC or HEVC or any encoded bit-stream, like for example HEVC tiles. In a preferred embodiment, a tile track is independently decodable (encoder took care to remove motion prediction from other tiles by generating "motion-constrained" tiles). When tile track corresponds to a video bit-stream encoded in HEVC with tiles, it can be encapsulated into an HEVC Tile track denoted as 'hvt1' track as described in ISO/IEC 14496-15 4th edition. It can then refer to a tile base track to obtain parameter sets, high level information to set up the video decoder. It can also be encapsulated into a HEVC track 'hvc1' or 'hev1' track. A tile track can be used for spatial composition of sub-pictures into a bigger image or picture.

A tile base track is a track common to one or more tile tracks that contain data or metadata that is shared among these one or more tracks. A tile base track may contain instructions to compose images from one or more tile tracks. Tile tracks may depend on a tile base track for complete decoding or rendering. When tile base track derives from a video bit-stream encoded in HEVC with tiles, it is encapsulated into an HEVC track denoted as 'hvc2' or 'hev2' track. In addition it is referenced by HEVC tile tracks via a track reference 'tbas' and it shall indicate the tile ordering using a 'sabt' track reference to the HEVC tile tracks as described in ISO/IEC 14496-15 4th edition.

A composite track (also denoted reference track) is a track that refers to other tracks to compose an image. One example of composite track is, in case of video tracks, a track composing sub-picture tracks into a bigger image. This can be done by post-decoding operation, for example in a track deriving from video tracks that provides transformation and transformation parameters to compose the images from each video track to a bigger image. A composite track can also be a track with extractor NAL units providing instructions to extract NAL units from other video tracks or tile tracks to form before decoding a bit-stream resulting from sub-bit-stream concatenation. A composite track can also be a track that implicitly provides composition instructions, for example through track references to other tracks.

ISO/IEC 14496-12 provides a box denoted 'trgr' located at track level (i.e. within the 'trak' box in ISOBMFF box hierarchy) to describe groups of tracks, where each group shares a particular characteristic or where the tracks within a group have a particular relationship. This track group box is an empty container defined as follows:
Box Type: 'trgr'
Container: TrackBox ('trak')
Mandatory: No
Quantity: Zero or one

```
aligned(8) class TrackGroupBox extends Box('trgr') {
}
```

This track group box can contain a set of track group type boxes defined as follows:

```
aligned(8) class TrackGroupTypeBox(unsigned int(32) track_group_type)
    extends FullBox(track_group_type, version = 0, flags = 0)
{
    unsigned int(32) track_group_id;
    // the remaining data may be specified for a particular
track_group_type
}
```

The particular characteristic or the relationship declared by an instance of this track group type box is indicated by the box type (track_group_type). This box also includes an identifier (track_group_id), which can be used to determine the tracks belonging to the same track group. All the tracks having a track group box with a track group type box having the same track_group_type and track_group_id values are part of the same track group. The box also allows declaration of specific parameters associated with the track for a particular track group type. The MPEG ISOBMFF standard (ISO/IEC 14496-12 $7^{th}$ edition Amendment 1—May 2018) is proposing a specific track group SpatialRelationship2DDescriptionBox for two dimensional spatial relationship as a TrackGroupTypeBox of type '2dcc'.

SpatialRelationship2DDescription Box TrackGroupType-Box with track_group_type equal to '2dcc' indicates that this track belongs to a group of tracks with 2D spatial relationships (e.g. corresponding to planar spatial parts of a video source). A SpatialRelationship2DDescriptionBox TrackGroupTypeBox with a given track_group_id implicitly defines a coordinate system with an arbitrary origin (0, 0) and a maximum size defined by total_width and total_height; the x-axis is oriented from left to right and the y-axis from top to bottom. The tracks that have the same value of source_id within a SpatialRelationship2DDescriptionBox TrackGroupType-Box are mapped as being originated from the same source and their associated coordinate systems share the same origin (0, 0) and the orientation of their axes. A source or video source corresponds to the content being captured by a camera or a set of cameras for omnidirectional content. For example, a very high resolution video could have been split into sub-picture tracks. Each sub-picture track then conveys its position and sizes in the source video.

Tracks in the same track group with the same source_ID shall declare the same output_width and output_height.

The two dimensional spatial relationship track group of type '2dcc' is defined as below:

```
aligned(8) class SpatialRelationship2DSourceBox
        extends FullBox('2dsr', 0, 0) {
    unsigned int(32) total_width;
    unsigned int(32) total_height;
    unsigned int(32) source_id;
}
aligned(8) class SubPictureRegionBox extends FullBox('sprg',0,0) {
    unsigned int(16) object_x;
    unsigned int(16) object_y;
    unsigned int(16) object_width;
    unsigned int(16) object_height;
}
aligned(8) class SpatialRelationship2DDescriptionBox extends
TrackGroupTypeBox('2dcc')
{
    // track_group_id is inherited from TrackGroupTypeBox;
    SpatialRelationship2DSourceBox( );        // mandatory, must be first
    SubPictureRegionBox ( );                  // optional
}
``` where
- object_x specifies the horizontal position of the top-left corner of the track within the region specified by the enclosing track group. The position value is the value prior to applying the implicit resampling caused by the track width and height, if any, in the range of 0 to total_width-1, inclusive, where total_width is defined by the enclosing track group,
- object_y specifies the vertical position of the top-left corner of the track within the region specified by the enclosing track group. The position value is the value prior to applying the implicit resampling caused by the track width and height, if any, in the range of 0 to total_height-1, inclusive, where total_height is defined by the enclosing track group,
- object_width specifies the width of the track within the region specified by the enclosing track group. The position value is the value prior to applying the implicit resampling caused by the track width and height, if any, in the range of 1 to total_width, inclusive, where total_width is defined by the enclosing track group,
- object_height specifies the height of the track within the region specified by the enclosing track group. The position value is the value prior to applying the implicit resampling caused by the track width and height, if any, in the range of 1 to total_height, inclusive, where total_height is defined by the enclosing track group,
- total_width specifies, in pixel units, the maximum width in the coordinate system of the 'srd' track group. The value of total_width shall be the same in all instances of SpatialRelationshipDescriptionBox with the same value of track_group_id,
- total_height specifies, in pixel units, the maximum height in the coordinate system of the 'srd' track group. The value of total_height shall be the same in all instances of SpatialRelationshipDescriptionBox with the same value of track_group_id, and
- source_id parameter provides a unique identifier for the source. It implicitly defines a coordinate system associated to this source.

SubPictureRegionBox( ) is an optional box providing the static positions and sizes of the track within the region specified by the enclosing track group.

If SubPictureRegionBox( ) is present in the SpatialRelationship2DDescriptionBox, then there shall be no associated SpatialRelationship2DGroupEntry in the associated track (this track has a constant, static, size and position).

If SubPictureRegionBox( ) is not present in the SpatialRelationship2DDescriptionBox, then there shall be one or more associated SpatialRelationship 2DGroupEntry(s) in the associated track (this track possibly has a dynamic size and/or position).

The SpatialRelationship2DGroupEntry( )defining the '2dcc' sample grouping allows declaring the positions and sizes of the samples from a sub-picture track in a two dimensional spatial relationship track group. Version 1 of the SampleToGroupBox shall be used when grouping_type is equal to '2dcc'. The value of grouping_type_parameter shall be equal to track_group_id of the corresponding spatial relationship track group.

The SpatialRelationship2DGroupEntry( ) is defined as follows:

```
class SpatialRelationship2DGroupEntry ( ) extends
VisualSampleGroupEntry ('2dcc') {
    unsigned int(16) object_x;
    unsigned int(16) object_y;
    unsigned int(16) object_width;
    unsigned int(16) object_height;
}
``` where
- object_x specifies the horizontal position of the top-left corner of the samples in this group within the coordinate system specified by the corresponding spatial relationship track group. The position value is the value prior to applying the implicit resampling caused by the track width and height, if any, in the range of 0 to total_width-1, inclusive, where total_width is included in the corresponding SpatialRelationship2DDescription Box,
- object_y specifies the vertical position of the top-left corner of the samples in this group within the coordinate system specified by the corresponding spatial relationship track group. The position value is the value prior to applying the implicit resampling caused by the track width and height, if any, in the range of 0 to total_height-1, inclusive, where total_height is included in the corresponding SpatialRelationship2DDescription Box, object_width specifies the width of the samples in this group within the coordinate system specified by the corresponding spatial relationship track group. The position value is the value prior to applying the implicit resampling caused by the track width and height, if any, in the range of 1 to total_width, inclusive, and object_height specifies the height of the samples in this group within the coordinate system specified by the corresponding spatial relationship track group. The position value is the value prior to applying the implicit resampling caused by the track width and height, if any, in the range of 1 to total_height, inclusive.

The samples of each track in a '2dcc' track group can be spatially composed with samples (at the same composition or decoding time) from other tracks in this same group to produce a bigger image.

Depending on encoded bit-streams and sub-bit-streams resulting from the encoding of a packed image 131 (step 140 of FIG. 1), several variants of encapsulation in file format are possible.

Figure 2:
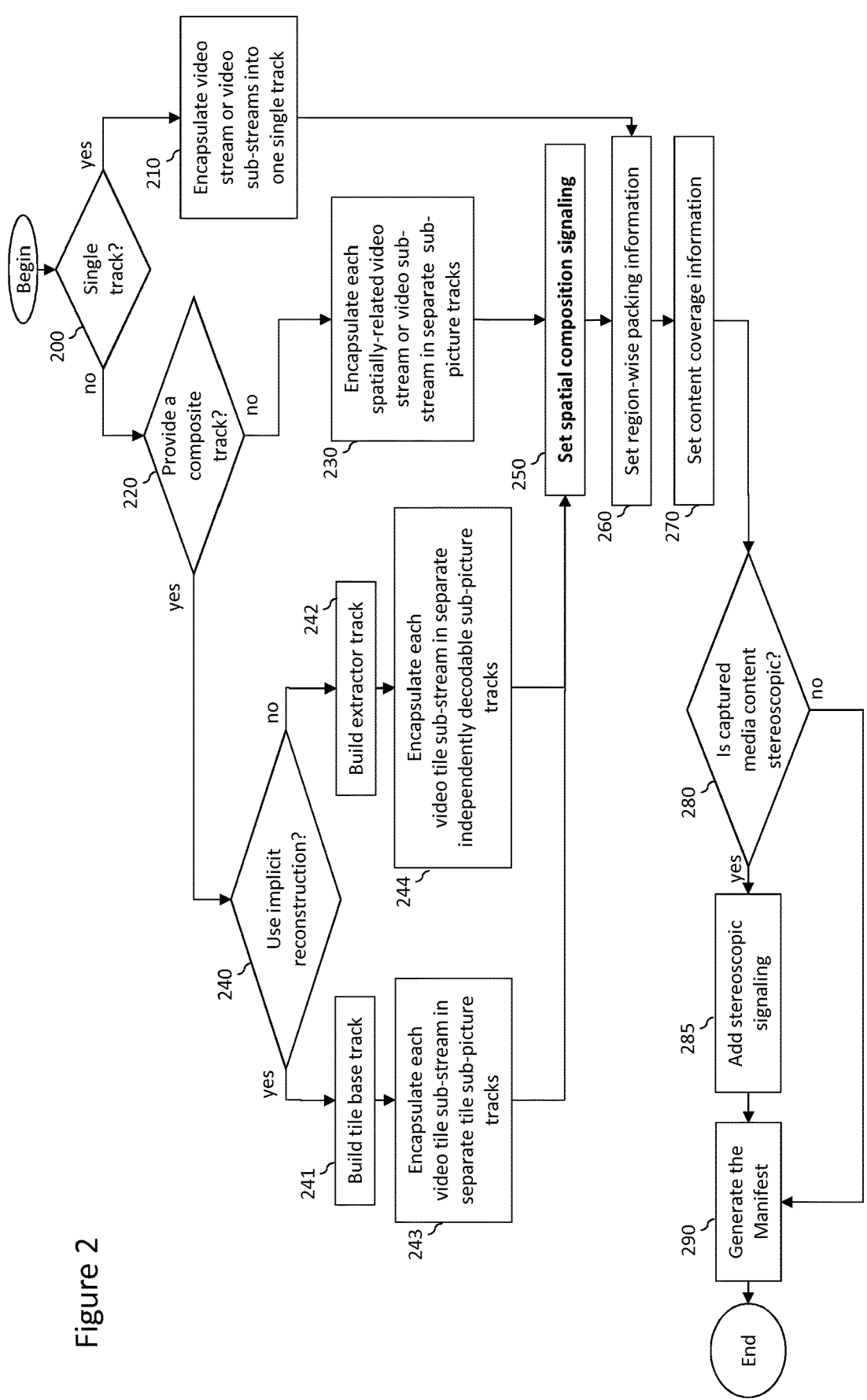
FIG. 2 illustrates a block diagram illustrating an example of encapsulation according to embodiments of the invention.

FIG. 2 illustrates a block diagram illustrating an example of file/segment encapsulation (step 150 of FIG. 1) according to an embodiment of the invention.

At step 200, the server determines if there are several spatially-related video bit-streams (i.e. representing spatial sub-part of packed images and for which a spatial composition may create a bigger image) or if there are video bit-streams comprising video sub-bit-streams representing either motion-constrained tiles or multiple views that can be exposed to the client as multiple sub-picture tracks. If the encoded packed image cannot be exposed as multiple tracks because it is encoded as a single video bit-stream or the content creator does not wish to expose the encoded packed image as multiple tracks, then video bit-stream or video sub-bit-streams are encapsulated into one single track (step 210). Otherwise, it is determined at step 220 if the media content to be encapsulated is composed of video sub-bit-streams representing motion-constrained tiles. If yes, at least one composite track may need to be provided to represent at least one composition of several tile tracks. The composition may represent the full packed images or only a sub-part of the full packed images. Using a composite track with tile tracks avoids requiring separate rendering and decoding of streams on the client-side. The number of possible combinations to be exposed to the client depends on content creator's choices. For instance, the content creator may want to combine tiles with different visual qualities depending on current user's viewport. For this, it can encode several times a packed image with different visual qualities and propose several composite tracks representing the full packed image comprising different combination of tiles in terms of visual qualities. By combining tiles at different qualities depending on user's viewport, the content creator can reduce the consumption of network resources.

If at step 220, it is determined that composite tracks must be provided, it is then determined if implicit reconstruction can be used or not for the composite track (step 240).

Implicit reconstruction refers to bit-stream reconstruction from tile base and tile tracks, for instance as defined in ISO/IEC 14496-15 4th edition. Rather than using in-stream structure such as extractors to re-build samples of a composite track from samples of tile tracks by replacing extractors in composite track's samples by the data they reference in tile tracks' samples, implicit reconstruction allows re-building composite track's samples by concatenating samples of the composite track and tile tracks in the order of track references (e.g. 'sabt' track references in HEVC implicit reconstruction).

The use of implicit reconstruction depends on the scenario of use. When the composition of several tile tracks requires a rearrangement of the tiles at the decoding compared to the order of tiles at the encoding, then some slice addresses must be rewritten. In such a case, implicit reconstruction is not possible and explicit reconstruction with extractors must be selected.

If implicit reconstruction is possible, a tile base track is generated (step 241), and the video sub-bit-streams are encapsulated as tile tracks not decodable independently (e.g. as HEVC 'hvt1' tracks).

Otherwise an extractor track is generated (step 242), and the video sub-bit-streams are encapsulated as tile tracks decodable independently (e.g. as HEVC 'hvc1' or 'hev1' tracks).

Going back to step 220, if the media content does not contain tile sub-bit-streams or the content creator does not want to create and expose composite tracks, then spatially-related video bit-streams or video sub-bit-streams (e.g. tile or multiple views) are encapsulated into separate sub-picture tracks (step 230). In such particular case, if the tile sub-bit-streams are HEVC tiles, they are encapsulated as HEVC track 'hvc1' or 'hev1' track.

At step 250, signaling for spatial composition is added to group together spatially-related video bit-streams or video sub-bit-streams. Spatial composition signaling can be provided by defining a specific TrackGroupTypeBox in each track (sub-picture tracks, tile tracks, composite tracks) that composes the group, for instance a track group of type '2dcc' with same track_group_id for all tracks pertaining to the same group as defined in MPEG ISOBMFF (ISO/IEC 14496-12 $7^{th}$ edition Amendment 1) as previously described.

This track group box '2dcc' would provide the relative two-dimensional coordinates of the track within the composition and the overall size of the image formed by the composition. The composition may represent entire packed images or only a sub-part of packed images. For instance, the content creator may want to expose multiple composite tracks allowing building the entire packed images or only sub-part of packed images.

Alternatively, the composition may represent entire projected images or only a sub-part of projected images.

Parameters from '2dcc' track group (track_group_id, source_id, total_width, total_height, object_x, object_y, object_width, object_height) directly match the parameters of the DASH Spatial-Relationship Description (SRD) descriptor (defined in ISO/IEC 23009-1 $3^{rd}$ edition) that can be used in a DASH manifest to describe the spatial relationship of Adaptation Sets representing those tracks:

track_group_id would match the DASH SRD spatial_set_id parameter, source_id would match the DASH SRD source_id parameter, object_x, object_y, object_width, object_height would match the DASH SRD parameters object_x, object_y, object_width, object_height parameters respectively, and total_width and total_height from the associated track group (via the track_group_id) would match the DASH SRD total_width, total_height parameters.

As an alternative, in case there is a composite track, spatial composition signaling can be provided implicitly by this composite track. Indeed, in case the composite track is a tile base track, the tile base track refers to a set of tile tracks via a track reference of type 'sabt'. This tile base track and set of tile tracks forms a composition group. Similarly, if the composite track is an extractor track, the extractor track refers to a set of tile tracks via a track reference of type 'scal'. This extractor track and set of tile tracks also forms a composition group. In both cases, relative two-dimensional coordinates of each tile track within the composition can be provided by defining a sample grouping or default sample grouping of type 'trif' as defined in ISO/IEC 14496-15 4$^{th}$ edition.

As another alternative, spatial composition signaling can be provided by defining a new entity group. An entity group is a grouping of items or tracks. Entity groups are indicated in a GroupsListBox in a MetaBox. Entity groups referring to tracks may be specified in GroupsListBox of a file-level MetaBox or in GroupsListBox of a movie-level MetaBox. The GroupListBox ('grpl') contains a set of full boxes, each called an EntityToGroupBox, with an associated four-character codes denoting a defined grouping type. The EntityToGroupBox is defined as follows:

```
aligned(8) class EntityToGroupBox(grouping_type, version, flags)
    extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
    // the remaining data may be specified for a particular
    grouping_type
}
```

Typically group_id provides the id of the group and the set of entity_id provides the track_ID of the tracks that pertains to the entity group. Following the set of entity_id, it is possible to extend the definition of the EntityToGroupBox by defining additional data for a particular grouping_type. According to an embodiment, a new EntityToGroupBox with for instance grouping_type equal to 'egco' (for Entity Group Composition) can be defined to describe the composition of two dimensional spatially-related video bit-streams or video sub-bit-streams. The set of entity_id would contains the set of track_ID of tracks (sub-pictures, tile tracks, composite tracks) that composes a group. The overall size of the image formed by the composition can be provided as part of additional data associated to this new grouping_type 'egco'.

EntityToGroupBox('egco') would be defined as follows:

```
aligned(8) class EntityToGroupBox('egco', version, flags)
    extends FullBox('egco', version, flags) {
    unsigned int(32) group_id;
    unsigned int(32) num_entities_in_group;
    for(i=0; i<num_entities_in_group; i++)
        unsigned int(32) entity_id;
    unsigned int(16) total_width;
    unsigned int(16) total_height;
    unsigned int(32) source_id;
}
``` where total_width and total_height provide the size of the composition and source_id provides a unique identifier for the source and implicitly defines a coordinate system (i.e., an origin (0, 0) and the orientation of their axes) associated to the source.

Compared with DASH, group_id would match the DASH SRD spatial_set_id parameter, source_id would match the DASH SRD source_id parameter, and total_width and total_height would match the DASH SRD total_width and total_height parameters, respectively.

The relative two-dimensional coordinates of each track within the composition defined by an entity grouping of type 'egco' can be provided by defining a track group of type ('egco') as defined below:

```
aligned(8) class SubPictureRegionBox extends FullBox('sprg',0,0) {
    unsigned int(16) object_x;
    unsigned int(16) object_y;
    unsigned int(16) object_width;
    unsigned int(16) object_height;
}
aligned(8) class SpatialRelationship2DDescriptionBox extends
TrackGroupTypeBox('2dcc')
{
    // track_group_id is inherited from TrackGroupTypeBox;
        SubPictureRegionBox ( );
}
``` where object_x, object_y, object_width, and object_height provide the relative two-dimensional coordinates of each track in the composition.

A given EntityToGroupBox of type 'egco' is associated with the corresponding SpatialRelationship2DDescriptionBox by defining a group_id equals to track_group_id.

Alternatively, the relative two-dimensional coordinates of each track within the composition defined by an entity grouping of type 'egco' can be provided by defining a sample grouping or default sample grouping of type 'trif' in each tile track as defined in ISO/IEC 14496-15 4$^{th}$ edition. As an alternative, relative two-dimensional coordinates can be defined as a new generic full box 2DCoordinateForEntityGroupBox('2dco') that would be located in VisualSampleEntry in each tile track pertaining to a group:

```
aligned(8) class 2DCoordinateForEntityGroupBox extends
    FullBox('2dco', version, flags)
{
    unsigned int(32) entity_group_id;
    unsigned int(16) object_x;
    unsigned int(16) object_y;
    unsigned int(16) object_width;
    unsigned int(16) object_height;
}
``` where
  entity_group_id provides the identifier of the associated EntityToGroupBox('egco') defining the group,
  object_x and object_y provide the horizontal and vertical position of the top-left corner of samples of this track within the composition, and
  object_width and object_height provide the width and height of the samples of this track within the composition.

As an alternative, this new generic box 2DCoordinateForEntityGroupBox('2dco') can be defined as a new sample grouping as follows:

```
class 2DCoordinateForEntityGroupBox extends
    VisualSampleGroupEntry('2dco')
{
    unsigned int(32) entity_group_id;
    unsigned int(16) object_x;
    unsigned int(16) object_y;
```

```
            unsigned int(16) object_width;
            unsigned int(16) object_height;
    }
```

Turning back to FIG. 2, region-wise packing information for the track is added to the metadata describing the encapsulation of video bit-streams or video sub-bit-streams, at step 260.

Region-wise packing provides information for remapping of a luma sample location in a packed region onto a luma sample location of the corresponding projected region. In MPEG OMAF, region-wise packing may be described according to following data structure:

```
aligned(8) class RegionWisePackingStruct( ) {
    unsigned int(1) constituent_picture_matching_flag;
    bit(7) reserved = 0;
    unsigned int(8) num_regions;
    unsigned int(32) proj_picture_width;
    unsigned int(32) proj_picture_height;
    unsigned int(16) packed_picture_width;
    unsigned int(16) packed_picture_height;
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i);
            if (guard_band_flag[i])
                GuardBand(i);
        }
    }
}
``` where
  proj_picture_width and proj_picture_height specify the width and height, respectively, of the projected picture, in relative projected picture sample units,
  packed_picture_width and packed_picture_height specify the width and height, respectively, of the packed picture, in relative packed picture sample units,
  num_regions specifies the number of packed regions when constituent_picture_matching_flag is equal to 0. When constituent_picture_matching_flag is equal to 1, the total number of packed regions is equal to 2*num_regions and the information in RectRegionPacking(i) and GuardBand(i) applies to each stereo constituent picture of the projected picture and the packed picture,
  RectRegionPacking(i) specifies the region-wise packing between the i-th packed region and the i-th projected region (i.e. convert x, y, width, height coordinates from packed region to projected region with optional transforms (rotation, mirroring)), and
  GuardBand(i) specifies the guard bands, if any, for the i-th packed region.

According to embodiments of the invention, when region-wise packing information is defined in a sub-picture track, this structure only describes the packing of the sub-picture track by reference to the complete projected picture. Thus packed_picture_width and packed_picture_height are equals to sub-picture track's width and height.

At step 270, content coverage information for the track and for compositions of tracks is added to the metadata describing the encapsulation of video bit-streams or video sub-bit-streams. This step is optional.

Track coverage information provides information on the area on the sphere covered by the content represented by this track.

Composition coverage information provides information on the area on the spherical surface that is associated with the combination of one or more tracks. For example, when a movie file contains multiple video tracks with spatial relationships, the composition coverage information is the area on the spherical surface that is covered by the spatial composition of these multiple video tracks. In another example, a media file contains multiple video tracks and a transformation matrix that indicates how to render this set of tracks, the composition coverage information then corresponds to the area covered by the assembled set of tracks. A "composition coverage information" can also be denoted "global coverage information" or "track group composition information". A composition or global coverage information can also describe the area on the spherical surface resulting from the composition of a subset of these multiple video tracks.

As a first embodiment, track coverage information and composition coverage information can be signaled using a single common CoverageInformationBox without additional signaling. In such a case, the scope of the CoverageInformationBox depends on the location of the definition of this box in the box hierarchy. Clients could determine whether the coverage information relates to track content or to the entire content just by considering where it is declared. According to this embodiment, the CoverageInformationBox is defined as follows:

Box Type: 'covi'

Container: Projected omnidirectional video box ('povd') or

SpatialRelationship2DDescriptionBox ('2dcc')

Mandatory: No

Quantity: Zero or one

```
aligned(8) class CoverageInformationBox extends FullBox('covi', 0, 0)
{
    ContentCoverageStruct( )
}
``` where ContentCoverageStruct specifies a number of covered regions described by SphereRegionStruct( ) as follows:

```
aligned(8) SphereRegionStruct(range_included_flag) {
    signed int(32) centre_azimuth;
    signed int(32) centre_elevation;
    signed int(32) centre_tilt;
    if (range_included_flag) {
        unsigned int(32) azimuth_range;
        unsigned int(32) elevation_range;
    }
    unsigned int(1) interpolate;
    bit(7) reserved = 0;
}
aligned(8) class ContentCoverageStruct( ) {
    unsigned int(8) coverage_shape_type;
    unsigned int(8) num_regions;
    unsigned int(1) view_idc_presence_flag;
    if (view_idc_presence_flag == 0) {
        unsigned int(2) default_view_idc;
        bit(5) reserved = 0;
    } else
        bit(7) reserved = 0;
```

```
        for ( i = 0; i < num_regions; i++) {
            if (view_idc_presence_flag == 1) {
                unsigned int(2) view_idc[i];
                bit (6) reserved = 0;
            }
            SphereRegionStruct(1);
        }
    }
``` where
- coverage_shape_type specifies the shape of the sphere regions expressing the content coverage,
- num_regions specifies the number of sphere regions,
- view_idc_presence_flag, default_view_idc, and view_idc[i] are attributes used to indicate if i-th sphere region is on the left, right, or both view of a stereoscopic content, and
- center_azimuth, center_elevation, and center_tilt specify the viewport orientation of the covered area relative to global coordinate axes, azimuth_range and elevation_range, when present, specify the azimuth and elevation ranges, respectively, of the covered sphere region and interpolate is currently not used.

Accordingly CoverageInformationBox provides information on the area on the sphere covered by the content. The nature of the content depends on the Container of this box. When present in a SpatialRelationship2DDescriptionBox '2dcc', the content refers to the entire content represented by all tracks belonging to the same sub-picture composition track group and a composition picture composed from these tracks is referred to as a packed picture of the entire content. When present in a sample entry of a track, the content refers to the content represented by this track itself, and the picture of a sample in this track is referred to as a packed picture of the entire content. When no CoverageInformation Box is present for a track, it indicates that the content covers the entire sphere.

It is to be noted that Projected omnidirectional video box ('povd') is an intermediate box defined by MPEG OMAF and located into a VisualSampleEntry in a track.

In addition, the SpatialRelationship2DDescriptionBox track group box ('2dcc') is modified as follows:

```
aligned(8) class SpatialRelationship2DDescriptionBox extends
TrackGroupTypeBox('2dcc')
{
    // track_group_id is inherited from TrackGroupTypeBox;
    SpatialRelationship2DSourceBox( );      // mandatory, must be first
    SubPictureRegionBox ( );                 // optional
    CoverageInformationBox( );               // optional
}
```

As a second embodiment, track coverage information and composition coverage information can be signaled using a single common CoverageInformationBox with a flag value to distinguish local and global indication. Since CoverageInformationBox is a ISOBMFF FullBox, the distinction between track and global coverage can be expressed through the flags parameter of the box.

According to this second embodiment, the CoverageInformation Box is defined as follows:
- Box Type: 'covi'
- Container: Projected omnidirectional video box ('povd')
- Mandatory: No
- Quantity: Zero or more

```
aligned(8) class CoverageInformationBox extends FullBox('covi', 0, 0)
{
    ContentCoverageStruct( )
}
```

The structure of the box is almost the same as in previous embodiment except that multiple instances of the box can be defined in case local and composition coverage information must be defined in a same track.

The CoverageInformationBox is then defined as providing information on the area on the sphere covered by the content. The nature of the content is given by the flags parameter. The default value for the Coverage Information flags is 0, meaning that this box describes the coverage of the entire content. If this track belongs to a two dimensional spatial relationship track group, the entire content refers to the content represented by all tracks belonging to the same two dimensional spatial relationship track group, and a composition picture composed from these tracks is referred to as a packed or projected picture of the entire content. Otherwise, the entire content refers to the content represented by this track itself, and the picture of a sample in this track is referred to as a packed or projected picture of the entire content.

When the value for the Coverage Information flags is 1, this box describes the spherical area covered by the packed or projected pictures of the content represented by this track.

The absence of this box indicates that the content covers the entire sphere.

In addition, a new flag value is defined as follows:
Coverage_local: Indicates that the coverage information is local to the track containing the box. Flag value is 0x000001. By default, this value is not set.

Going back to FIG. 2, at step 280, it is checked if the virtual reality media content is actually stereoscopic virtual reality media content, i.e. comprises left and right views.

If the content is only monoscopic, the process directly goes to step 290.

If the content is stereoscopic, stereoscopic signalling is added to the encapsulation at step 285.

For stereoscopic content, classically, both left and right view sequences are acquired from a stereoscopic camera and are composited into a video sequence or two video sequences according to a composition type.

The process to combine two frames representing two different views of a stereoscopic content into one single frame is called frame packing (see step 125 in FIG. 1).

Frame packing consists in packing two views that form a stereo pair into a single frame. There exists several well-known and used frame packing schemes: side by side, top-bottom, frame sequential, vertical line interleaved type . . . . For example, the MPEG application format ISO/IEC 23000-11 $1^{st}$ edition ("Stereoscopic video application Format") or ISO/IEC 23001-8 $2^{nd}$ edition ("Coding-independent code-points (CICP)") defines some of these schemes. Frame packing can also consist in keeping each view in separate frames like for example the VideoFramePackingType having the value 6 defined in ISO/IEC 23001-8 $2^{nd}$ edition ("CICP").

For instance, still according to this specification, the value 3 signals that each decoded frame contains a side-by-side packing arrangement of corresponding frames of two constituent views, the value 4 signals that each decoded frame contains a top-bottom packing arrangement of corresponding frames of two constituent views.

In order to signal if a track contains stereoscopic media data, a StereoVideoBox is defined in VisualSampleEntry in the track.

Turning back to step 250 of FIG. 2, the SpatialRelationship2DDescriptionBox is defined to match the definition of the Spatial Relationship Descriptor 'SRD' as defined in Dynamic Adaptive Streaming over HTTP (DASH) protocol (ISO/IEC 23009-1 3rd edition) to express spatial relationships between video tracks as provided in the Table below:

| ISOBMFF parameter | DASH SRD parameter |
| --- | --- |
| trgr::'2dcc'::track_group_id | spatial_set_id |
| trgr::'2dcc'::'sprg'::object_x | object_x |
| trgr::'2dcc'::'sprg'::object_y | object_y |
| trgr::'2dcc'::'sprg'::object_width | object_width |
| trgr::'2dcc'::'sprg'::object_height | object_height |
| trgr::'2dcc'::'2dsr'::total_width | total_width |
| trgr::'2dcc'::'2dsr'::total_height | total_height |
| trgr::'2dcc'::'2dsr'::source_id | source_id |

A TrackGroupTypeBox with '2dcc' track_grouping_type indicates that the track belongs to a group of tracks corresponding to spatial parts of a video. The tracks that have the same value of source_id within a TrackGroupTypeBox of track_group_type '2dcc' are mapped as being originated from the same source (i.e. with same origin (0, 0), and same orientation of their axes). More precisely, the complete composition pictures (with size total_width and total_height) from two track groups with same source_id are perceptually or visually equivalent (e.g. two composition pictures representing the same visual content at two different resolutions or two different qualities).

All sub-picture tracks belonging to a TrackGroupTypeBox with '2dcc' track_grouping_type and same track_group_id shall have the same source_id.

Tracks belonging to a TrackGroupTypeBox with '2dcc' track_grouping_type and different track_group_id are compatible and can be combined together if they have the same source_id. Otherwise, sub-picture tracks do not represent sub parts of the same source and/or they are not intended to be combined with sub-picture tracks from another TrackGroupTypeBox with '2dcc' track_grouping_type and different source_id. For instance, two sub-picture tracks do not represent sub parts of the same source when the two-dimensional projected picture representing this source are not visually equivalent (e.g. they have different projection format or different viewport orientations).

As an alternative, this later rule applies even if it exists an alternate group grouping sub-picture tracks from '2dcc' track group with different source_id. That means those sub-pictures track are alternatives (for instance they have different coding format, e.g. AVC and HEVC) but they are not intended to be combined with sub-picture tracks with different coding format.

Figure 4:
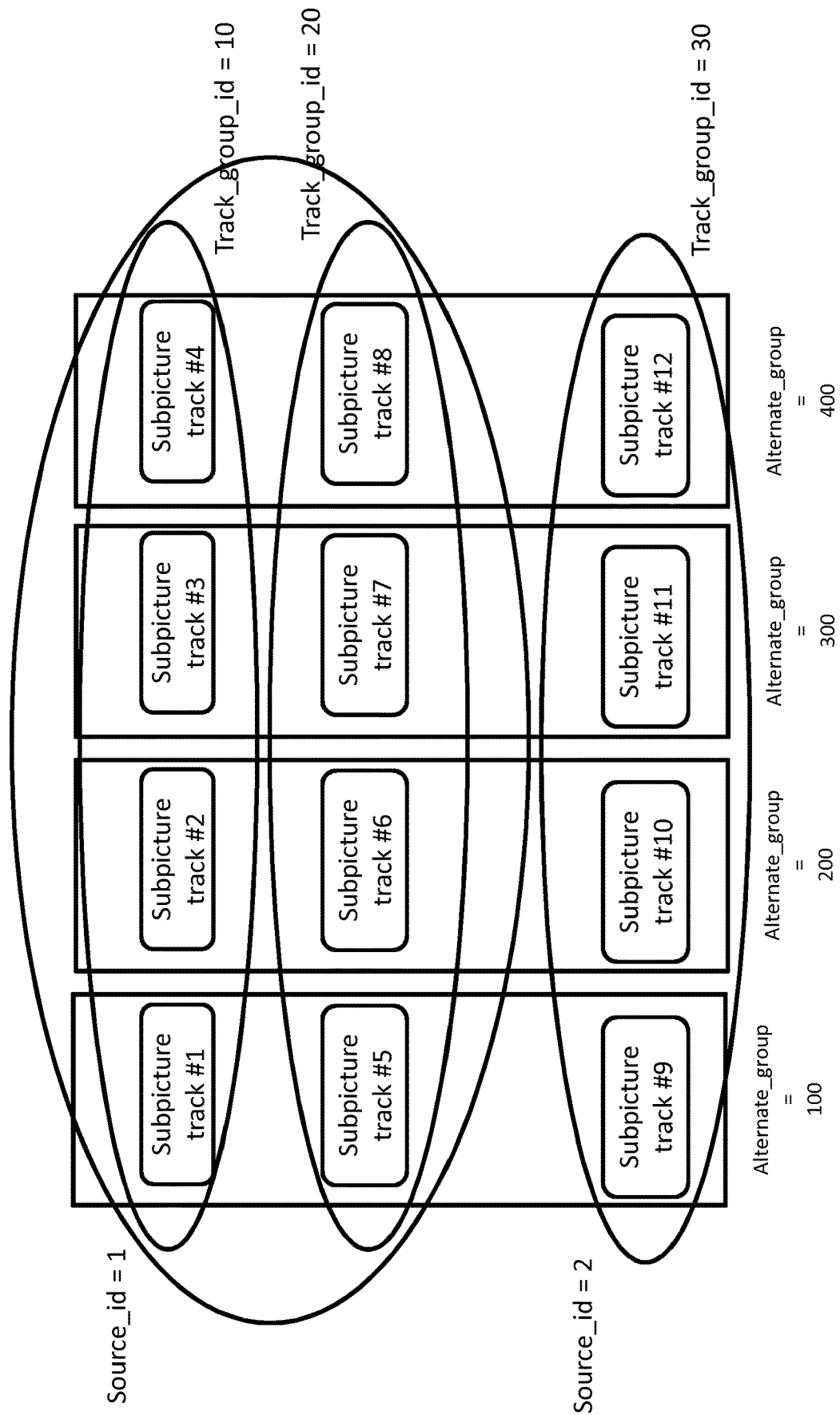
FIG. 4 illustrates an example of coding sub-pictures comprising media data from different media sources in several tracks and groups.

FIG. 4 illustrates an example of above rules. Tracks #1 to #4 belong to a track group 41 of type '2dcc' with track_group_id equals to 10 and source_id equals to 1. Tracks #5 to #8 belong to a different track group 42 of type '2dcc' with track_group_id equal to 20 but with the same source_id 400 equals to 1. There is also a third track group 43 of type '2dcc' with a track_group_id equals to 30 and a different source_id 401 equal to 2. In addition, there are several alternate groups 44 to 47. All tracks that belong to the same alternate group (i.e. that have the same alternate_group identifier in their track header box 'tkhd') specify a group or collection of tracks containing alternate data. Alternate data may correspond to alternate bitrate, codec, language, packet size etc. Only one track within an alternate group should be played or streamed at any one time. In this example, Tracks #1, #5 and #9 belong to the same alternate group 44 with identifier equal to 100. For instance, track #1 and track #5 are alternate tracks with different qualities, and track #9 is an alternate track to track #1 and track #5 in terms of codec. Tracks #2, #6 and #10 belong to the same alternate group 45 with identifier equal to 200, For instance, track #2 and track #6 are alternate tracks with different resolutions, and track #10 is an alternate track to track #2 and track #6 in terms of frame rate. etc. . . . , and so on.

The track groups 41 and 42 have the same source_id 400 and the track group 43 has a different source_id 401 meaning that sub-picture tracks belonging to track groups 41 and 42 can be combined together (with respect to other constraints, i.e almost one sub-picture track per alternate groups). On contrary, sub-picture tracks from track group 43 are not intended to be combined with any sub-picture tracks from track groups 41 and 42 despite they may belong to a same alternate group because they do not have the same source_id. The source_id parameter then provides an indication to the players on the sub-picture tracks that can be part of a same spatial composition. For a given spatial position, one sub-picture track can be considered visually equivalent to another sub-picture track at the same given spatial position. This is useful for (sub-picture) track selection when the media content is provided into multiple tracks. Moreover, it allows dynamic adaptation (in quality/bitrate or resolution) to display a same spatial composition, depending on the selected the sub-picture tracks. Some examples of use are described according to FIGS. 5 and 6.

Figure 5:
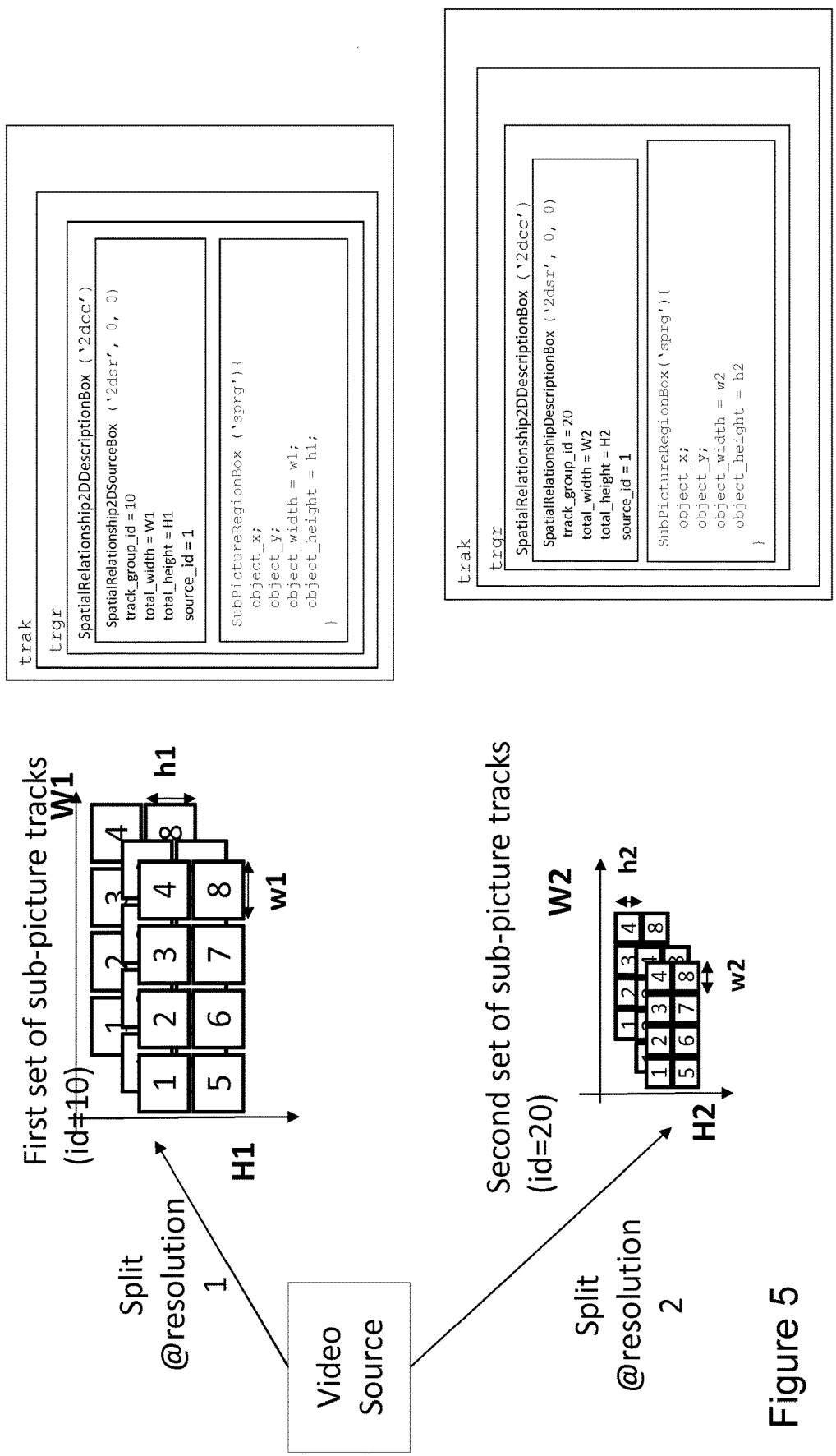
FIG. 5 illustrates an example of use of the SpatialRelationship2DdescriptionBox and the source_id according to embodiments of the invention.

FIG. 5 illustrates an example of use of the SpatialRelationship2DdescriptionBox and the source_id according to embodiments of the invention. The same video source (e.g. the same projected video source) is used to generate two alternative versions, in terms of quality (@quality1 and @quality2). Each alternative version is split into eight sub-picture tracks (containing projected regions or packed regions). A first set of sub-picture tracks is available in low quality. A second set of sub-picture tracks is available in higher quality. Two track groups are defined, one per quality level. The corresponding sub-picture tracks can be described as on the right part of the FIG. 5 (in the 'trak' box hierarchy). Both track groups have the same source_id, total_width and total_height. Sub-picture track coordinates (object_x, object_y, object_width, object_height) describe the sub-picture track's spatial relationship or position within their respective track group composition. As both track groups have the same source_id, this means that they represent the same source and sub-picture tracks from the first track group (with track_group_id equals to 10) can be combined with sub-picture tracks from the same track group but also with sub-picture tracks from the second track group (with track_group_id equals to 20) with respect to their respective position in the composition.

Figure 6:
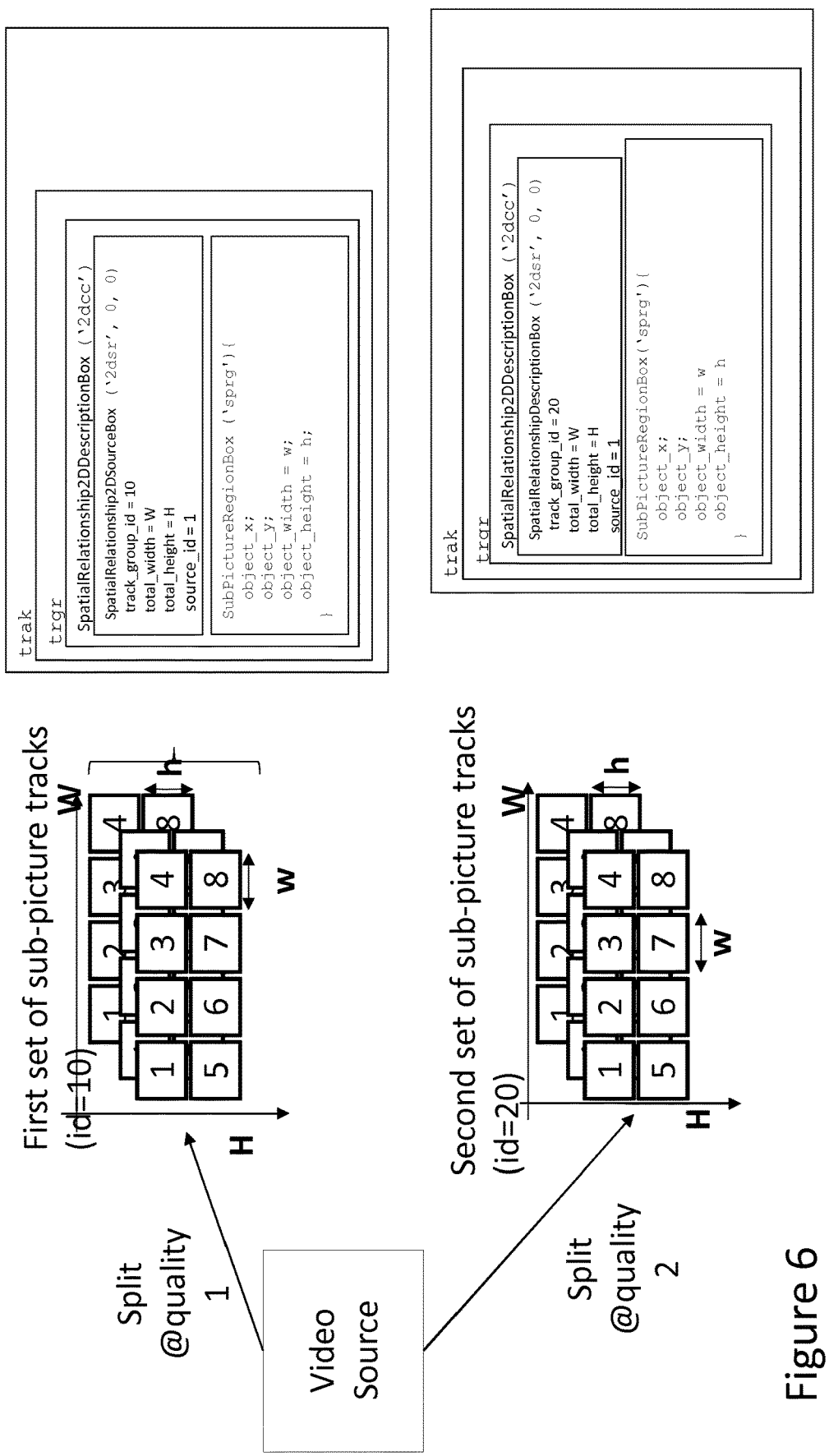
FIG. 6 illustrates a second example of use of the SpatialRelationship2DdescriptionBox and the source_id according to embodiments of the invention.

FIG. 6 illustrates a second example of use of the SpatialRelationship2DdescriptionBox and the source_id according to embodiments of the invention. The same video source (e.g. the same projected video source) is used to generate two alternative versions, in terms of resolution (@resolution1 and @resolution2). There are two sets of sub-picture tracks: one for the high resolution and one for the low resolution.

The corresponding sub-picture tracks can be described as on the right part of the FIG. 6 (in the 'trak' box hierarchy).

Both track groups have the same source_id, but different total_width and total_height corresponding to the resolution of each set of sub-picture tracks. Sub-picture track coordinates (object_x, object_y, object_width, object_height) describe the sub-picture track's spatial relationship or position within their respective track group composition. Again, as both track groups have the same source_id, this means that they represent the same source and sub-picture tracks from the first track group (with track_group_id equal to 10) can be combined with sub-picture tracks from the same track group but also with sub-picture tracks from the second track group (with track_group_id equal to 20) with respect to their respective position in their respective composition. In this case, scaling shall be applied to sub-picture tracks from different track groups if they are combined together. The scaling factor can be deduced from the ratio between total_height and total_width from each track group (e.g. H1/H2 and W1/W2)

According to this example, the composition picture represented by the track group with track_group_id equals to 10 can be composed by selecting one sub-picture from each alternate group On contrary to two-dimensional (2D) video content, OMAF media content represents an omnidirectional media content illustrating the user's viewing perspective from the centre of a sphere looking outward towards the inside surface of the sphere. This 360° media content is then projected in a two-dimensional plane by applying a video projection format. Then, optionally, region wise packing is applied to reorganize regions from the projected picture into packed regions. A 360° media content may also be represented by several circular images captured with a fisheye lens (wide-angle camera lens).

Thus, in the context of OMAF, a 2D picture may be either a projected picture or a packed picture and sub-picture tracks may contain different kind of contents:
   sub parts of a projected picture (with no packing),
   sub parts of a frame-packed picture, for example when the content is stereoscopic,
   sub parts of a projected and packed picture, or
   sub parts of a fisheye coded picture.

According to embodiments of the invention, the definition of SpatialRelationship2DdescriptionBox is improved to indicate whether the size and position coordinates of sub-picture tracks containing OMAF media content are relative to the projected picture, to the packed picture, or to another picture.

In one embodiment, SpatialRelationship2DdescriptionBox is defined so that the size and position coordinates of sub-picture tracks containing OMAF media content are always relative to the packed picture. When there is no packing, the packed picture is equals to the projected picture.

In another embodiment, SpatialRelationship2DdescriptionBox is defined so that the size and position coordinates of sub-picture tracks containing OMAF media content are relative to the projected picture or to the packed picture or any intermediate picture in the processing steps between the capturing step 110 and the encoding step 140. In particular, in the case of the application format for omnidirectional media (OMAF), it is not clear whether positions and sizes expressed in the 2D spatial relationships refer to the projected or to the packed picture.

In one embodiment, the SpatialRelationship2DdescriptionBox is always relative to the packed picture. When there is no packing, the packed picture is the same as the projected picture.

In another embodiment, a preferred approach is to define that SpatialRelationship2DdescriptionBox is always relative to the projected picture.

The method for encapsulating encoded media data corresponding to a wide view of a scene may comprise in some embodiments the following steps:
   obtaining a projected picture from the wide view of the scene;
   packing the obtained projected picture in at least one packed picture;
   splitting the at least one packed picture into at least one sub-picture;
   encoding the at least one sub-picture into a plurality of tracks;
   generating descriptive metadata associated the encoded tracks,
wherein the descriptive metadata comprise an item of information associated with each track being indicative of a spatial relationship between the at least one sub-picture encoded in the track and the at least one projected picture.

Accordingly, no particular signalling of the reference picture is needed. The reference picture is defined to be the projected picture even if the sub-picture are obtained by splitting the packed picture.

The method for encapsulating encoded media data corresponding to a wide view of a scene may comprise in some embodiments the following steps:
   obtaining a projected picture from the wide view of the scene;
   splitting the projected picture into at least one sub-picture;
   encoding the at least one sub-picture into a plurality of tracks;
   generating descriptive metadata associated with the encoded tracks, the descriptive metadata comprise a first item of information associated with each track being indicative of a spatial relationship between the at least one sub-picture encoded in the track and a reference picture;
   wherein the descriptive metadata further comprises a second item of information indicating the reference picture.

Accordingly, by specifying the reference picture in the metadata, it is possible to generate sub-picture data related to any of the projected picture, the packed picture or any other reference picture independently of the splitting operation.

The table below proposes a practical mapping of the SpatialRelationship2DdescriptionBox track group sizes and coordinates attributes relative to the projected picture in the context of OMAF for sub-picture tracks containing either projected, for example using Equirectangular (ERP) or cubemap projections, packed or fisheye contents. In the table below, "rwpk" is a shortcut for the region-wise packing structure, i.e. a structure that specifies the mapping between packed regions and the respective projected regions and specifies the location and size of the guard bands, if any. As well, 'fovi' is a shortcut for the FisheyeVideoEssentialInfoStruct, a structure that describes parameters for enabling stitching and rendering of fisheye images at the OMAF player.

| Type of the source | total_width/total_height | object_width/object_height | object_x/object_y |
|---|---|---|---|
| Projected picture (no packing) | Shall be equal to the luma picture size of the projected picture | Shall be equal to width and height of the projected region represented by the sub-picture track's samples (In such a case, shall be equal to width and height declared in the track header box of the sub-picture track) | Shall be equal to the x, y coordinate of the top-left corner of the projected region represented by the sub-picture track's samples within the projected picture |
| Projected and packed picture | Shall be equal to the luma picture size of the projected picture Total_width = rwpk@proj_picture_width Total_height = rwpk@proj_picture_height | Shall be equal to width and height of the projected region represented by unpacking the sub-picture track's samples (In such a case, the projected region resulting from the unpacking of the sub-picture track may contain gaps) | Shall be equal to the x, y coordinate of the top-left corner of the projected region represented by unpacking the sub-picture track's samples within the projected picture |
| Fisheye projected picture | Shall be equal to the luma picture size of the projected image, i.e. the image including all circular images. Total_width = fovi@rect_region_left + fovi@rect_region_width of the last circular image. Total_height = fovi@rect_region_top + fovi@rect_region_height of the last circular image | Shall be equal to the width and height of the rectangular projected region that contains the one or more circular images from the sub-picture track. E.g. in case a sub-picture track contains only one circular image: Object_width = fovi@rect_region_width Object_height = fovi@rect_region_height In case the sub-picture track contains more than one circular image, the object_width (resp. object_height) is equal to the sum of the fovi@rect_region_width (resp. the sum of the fovi@rect_region_height) of the contained circular images | Shall be equal to the coordinates of the top-left corner of the rectangular projected region that contains the one or more circular images from the sub-picture track E.g. in case only one circular image: Object_x = fovi@rect_region_left Object_y = fovi@rect_region_top In case the sub-picture track contains more than one circular image, the object_x (resp. object_y) is equal to the fovi@rect_region_left (resp. the fovi@rect_region_top) of the most top-left circular image in the list of contained circular images. |

Defining SpatialRelationship2DdescriptionBox attributes as relative to the projected picture provides an advantage to the application compared to defining them as relative to the packed picture. Indeed, in case of viewport-dependent streaming, the application may only want to download sub-picture tracks corresponding to current user's viewport (i.e. corresponding to user's field of view and orientation). If the SpatialRelationship2DdescriptionBox attributes are defined as relative to the projected picture, the application can directly use this information from the SpatialRelationship2DdescriptionBox track group to select appropriate sub-picture tracks while it is moving inside the projected picture. Otherwise, the application needs to parse, in addition to track group information, the region-wise packing information located in the VisualSampleEntry to convert sub-picture packed content into the projected picture before being able to select appropriate sub-picture tracks.

Optionally, the track group describing spatial relationship (e.g. the '2dcc' track group) may contain an additional descriptor providing, for a given sub-picture track, its mapping to the 360° sphere. This additional descriptor provides without any computation for the media player the mapping between the 2D video sub-picture track and a 3D viewport, so that selection by the player of the relevant track or set of tracks corresponding to a given user's viewing direction is easier. The track group describing the spatial relationships then rewrites as follows:

```
aligned(8) class SpatialRelationship2DDescriptionBox extends
TrackGroupTypeBox('2dcc') {
    // track_group_id is inherited from TrackGroupTypeBox;
    SpatialRelationship2DSourceBox( );        // mandatory, must be first
    SubPictureRegionBox ( );                  // optional
    SphericalRegionBox ( );                   // optional
}
```

Where the SpatialRelationship2DSourceBox and SubPictureRegionBox respectively describe the 2D coordinate system of the sub-picture tracks pertaining to the track group and their positions and sizes;

Where SphericalRegionBox is a new box defined as follows (the four-character code is just an example, any four-character code may be used, provided it is reserved for the indication of spherical region):

```
aligned(8) class SphericalRegionBox extends FullBox('sspr', 0, 0) {
    SphereRegionStruct(1);
}
```

Where the SphereRegionStruct specifies a sphere region as a triplet (centre_azimuth, center_elevation, center_pitch) or sometimes (yaw, pitch, roll) with ranges for the azimuth (vertical) and elevation (horizontal) dimensions.

Figure 7:
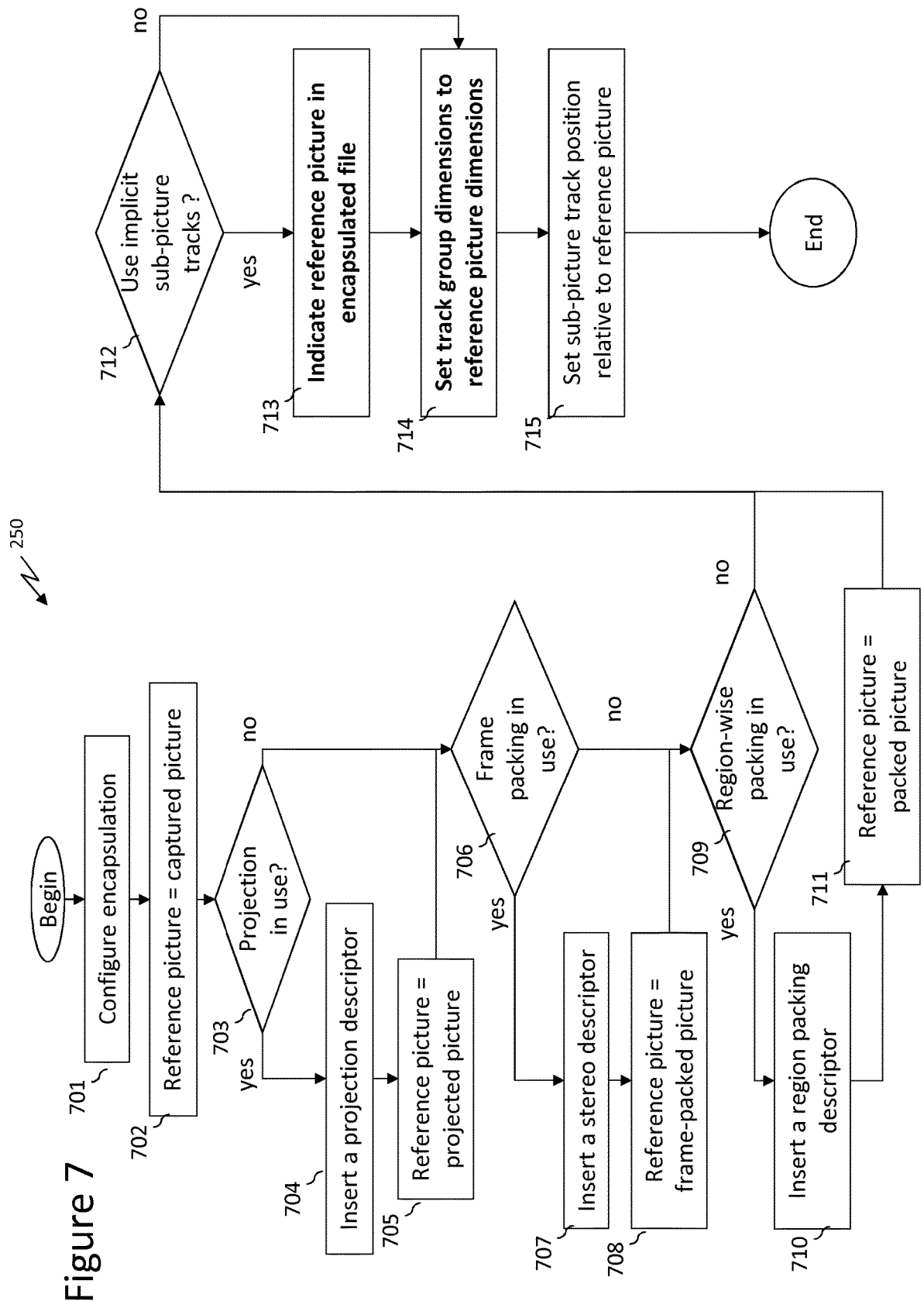
FIG. 7 illustrates the sub-picture encapsulation according to embodiments of the invention.

FIG. 7 illustrates the sub-picture encapsulation according to embodiments of the invention. It corresponds to the steps 250 of FIG. 1 with the optional steps 260 and 280 and 285. In step 701, the user configures the encapsulation module (for example an ISOBMFF writer or mp4 packager or writer in charge of step 150 on FIG. 1). This can be done through a graphical user interface controlling an encapsulation software. This consists in specifying information on the source to encapsulate or parameters for the encapsulation like decomposition into sub-picture tracks for example, or generation of one single media file or many segment files. Alternatively, this can be pre-registered as settings in the recording device capturing the scene (camera, network camera, smartphone . . . ). Then, the encapsulation module initializes the reference picture in step 702 as the captured image. This consists in storing in RAM of the device running the encapsulation module the sizes of the captured image. Next, at step 703, the encapsulation module checks whether the encapsulation configuration contains a projection step. If false, next step is 706. For example, when captured content is 360° content, it can be projected onto a 2D image, called the projected picture. If a projection is in use (test 703 true) then the encapsulation module inserts (step 704) the description of the projection in use in the descriptive metadata of the media file (or media segments). This can be for example a Projected omnidirectional video box 'povd' according to OMAF specification. Then (step 705), the reference picture is set to projected picture. This means for example that the sizes of this projected picture are stored in memory. The step 706 consists in checking if the captured source is stereoscopic or not and whether the views are packed into a single frame. If the test 706 is true, then the encapsulation module inserts (step 707) in the media file a descriptor for stereo content. In case of OMAF or ISOBMFF it is a StereoVideoBox. If the test 706 is false, next step is 709. Following step 707, the frame-packed picture is stored in memory at the reference picture. The test 709 consists in checking whether the encapsulation configuration indicates that the projected and optionally frame-packed picture needs to be further rearranged into packed regions. If test 709 is true, the encapsulation module inserts (step 710) the description of this packing into regions (equivalent to the optional step 260 of FIG. 1). In the case of OMAF, it can be a RegionWisePackingBox identified by the 'rwpk' box type. Then in 711, the reference picture is set to the packed picture. If test 709 is false, the next step is 712. The test in Step 712 consists in checking the encapsulation configuration: whether implicit signaling or explicit signaling for sub-picture tracks is chosen or set by the user or the application. If the implicit signaling is off, then at step 713, the encapsulation module inserts descriptive metadata providing which reference picture is used for sub-picture track generation (i.e. the picture that has been split into spatial parts, each encapsulated in sub-picture tracks). If the implicit signaling is on, then next step is 714. At step 714, the encapsulation module inserts a track group describing the spatial relationships among the different spatial parts of the split picture. In particular, the size of the resulting composition of the sub-picture tracks is set to the size of the reference picture stored in memory (in 702, 705, 708 or 711). This can be for example the total_width and total_height parameters in the SpatialRelationship2DSourceBox. Finally, at step 715, the encapsulation module describes each sub-picture track in terms of positions and sizes in the reference picture. This consists for example in OMAF or ISOBMFF to put the values resulting from the split into the parameters of the SubPictureRegionBox, when these parameters are static, or in the sample group description box for spatial relationship description (for example the SpatialRelationship2DGroupEntry box).

Figure 8:
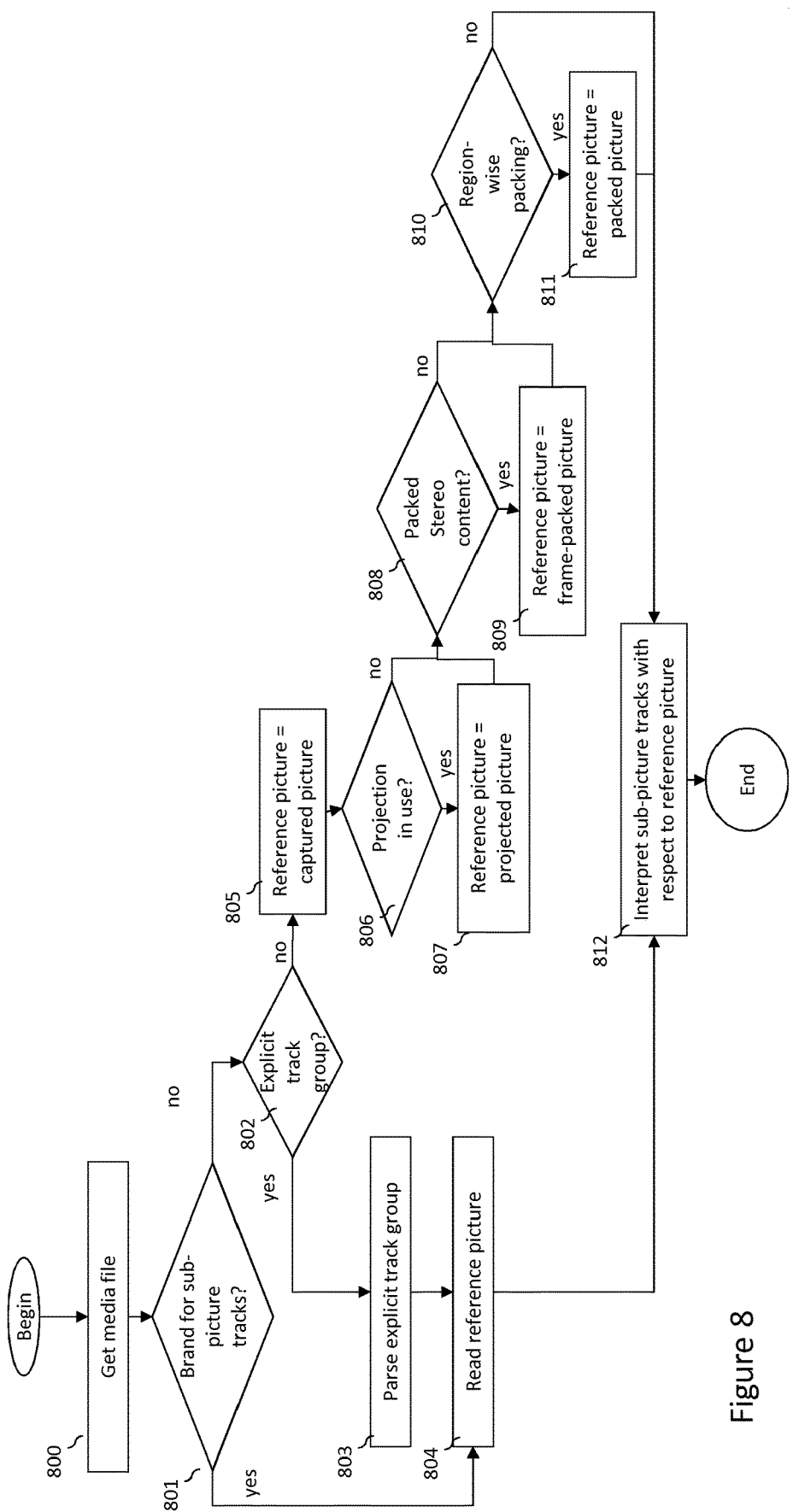
FIG. 8 illustrates the parsing process according to embodiments of the invention.

The explicit signaling of step 713 can be done in various ways as described along with the description of the parsing process as illustrated by FIG. 8.

The method for generating at least one image from a media file comprising a plurality of encoded tracks and associated descriptive metadata may comprise in some embodiments:
  determining that the plurality of encoded tracks comprise
    a group of tracks encoding at least one sub-picture
    resulting from the splitting of a packed picture obtained
    by packing a projected picture of a wide view of a
    scene;
  parsing descriptive metadata associated with the group of
    tracks;
  wherein parsing descriptive metadata associated with the
    group of tracks comprises:
  interpreting an item of information associated with each
    track being indicative of a spatial relationship between
    the at least one sub-picture encoded in the track and the
    at least one projected picture.

The method for generating at least one image from a media file comprising a plurality of encoded tracks and associated descriptive metadata may comprise in some embodiments:
  determining that the plurality of encoded tracks comprise
    a group of tracks encoding at least one sub-picture
    resulting from the splitting of a projected picture of a
    wide view of a scene;
  parsing descriptive metadata associated with the group of
    tracks;
  wherein parsing descriptive metadata associated with the
    group of tracks comprises:
  interpreting a first item of information associated with
    each track being indicative of a spatial relationship
    between the at least one sub-picture encoded in the
    track and the at least one reference picture; and
  interpreting a second item of information indicating the
    reference picture.

The media player, using an ISOBMFF parser, receives the OMAF file in 801. It identifies the different tracks present in the media file and in particular the video tracks. For those video tracks, the parser checks whether these are classical 2D videos or video tracks for omnidirectional media that have been projected onto a 2D picture. This is determined by looking at the major brand or in the list of compatible brands in the 'ftyp' box in step 802. For example, a brand set to 'ovdp' indicates that the media file contains a VR experience using the technologies for the OMAF viewport-dependent baseline presentation profile. This invention proposes in an embodiment to define an explicit brand (as major_brand value or to be put in the list of compatible brands) indicating that the VR experience according to an OMAF viewport-dependent profile further uses sub-picture tracks. At least two specific values for brands (major or compatible) may be defined:

A first value may be defined, for example named 'odpr', for omnidirectional dependent profile. This value indicates that the omnidirectional media is split into sub-picture tracks referencing the projected picture. Any ISOBMFF parser or OMAF player compliant to this brand shall interpret sub picture tracks positions as positions in the projected picture. As well, the total_width and total_height shall be respectively interpreted as the width and height of the projected picture.

A second value may be defined, for example named 'odpa', for omnidirectional dependent profile. This value indicates that the omnidirectional media is split into sub-picture tracks referencing the packed picture. Any ISOBMFF parser or OMAF player compliant to this brand shall interpret sub picture tracks positions as positions in the packed picture. As well, the total_width and total_height shall be respectively interpreted as the width and height of the packed picture.

When one of this brand is present, the OMAF player or media player immediately identifies how to get the reference picture information. It then parses the explicit track group for spatial relationship description that contains an indication of the reference picture. This is done at step 803.

When none of these brands is present in the 'ftyp' box, the media file parser or media player has to further parse the media file to determine the presence of sub-picture tracks and whether they reference projected or packed picture (object of test 802). If the track groups describing spatial relationship are explicit tracks groups according to embodiments of this invention, then the parser parses in 803 these explicit track groups. It determines at step 804 the reference picture in use to describe the sub picture tracks in a given track group (identified through the track_group_id for example). This has to be taken into account when presenting sub picture tracks to the user for selection or when rendering the sub picture tracks. Additional transformation may be required to generate the image from the sub picture track expressed in the reference picture to the captured picture. For example when the reference picture is the packed picture, to be expressed in the projected picture, the sub-picture track positions and sizes have to be unpacked. This processing is the object of step 812. We now explain how explicit signaling is performed during encapsulation step 713 to be used by parser in step 803.

In alternative embodiments to the new brands, it is proposed to add an explicit signaling at the track or track group level. This may be done using the '2dcc' track group for 2D spatial relationship description in ISOBMFF. This additional signaling can help parsers or players to handle sub-picture tracks, in particular to determine whether they express position and sizes for the projected picture or for the packed picture.

One embodiment for such signaling may be to define a new parameter in the specific track group type box for the spatial relationship description. Preferably it is defined in the mandatory part of the track group box, namely the SpatialRelationship2DSourceBox, for spatial relationship description, so that a parser can obtain the information.

An example of this embodiment may be:

```
aligned(8) class SpatialRelationship2DDescriptionBox extends
TrackGroupTypeBox('2dcc')
{
    // track_group_id is inherited from TrackGroupTypeBox;
    SpatialRelationship2DSourceBox( );        // mandatory, must be first
    SubPictureRegionBox ( );                  // optional
}
aligned(8) class SpatialRelationship2DSourceBox        extends
FullBox('2dsr', 0, 0) {
    unsigned int(32) total_width;
    unsigned int(32) total_height;
    unsigned int(32) source_id;
    unsigned int(1) reference_picture;
    unsigned int(31) reserved
}
``` where "reference_picture" is a new parameter that when taking value "0" indicates that the positions for the sub picture tracks in this group are expressed in the projected picture coordinate system. When taking value "1", it indicates that sub picture tracks in this group are expressed in the packed picture. The name given to this parameter is an example. As well, the total_width and total_height respectively indicate the width and the height of the projected picture.

To be more generic than simply supporting a choice of reference picture between the projected or the packed picture, the reference_picture may take several values, the value corresponding to the intermediate picture to use as reference between the capture and the encoding. For example value 0 may be used for captured image (step 702) when there is no projection, value 1 may be used when there is projection only (step 705), value 2 for frame-packed picture (step 708) and value 3 for packed frame (711). This indication would require 2 bits compared to the previous embodiment supporting only projected and packed frame.

Another embodiment, being more explicit signaling, consists in providing a 4 cc code to describe the reference picture (instead of an integer value). This would be more costly in terms of description (4 bytes per sub-picture track). For example, to indicate that reference picture is the projected picture, the reference picture value could be set to 'povd'. For the packed picture, it could be set to 'rwpk'; for frame-packed picture, it could be 'stvi'. For the captured image, the default case could be set to a dedicated four character code: 'dflt' for "default", meaning the captured image. Preferably, a mapping between an intermediate picture and an integer code is defined and registered for example by mp4 registration authority to have interoperable codes for the reference picture value.

The additional reference_picture parameter may alternatively be declared in the optional part of the SpatialRelationship2DDescriptionBox, namely the SubPictureRegionBox. It may be preferable to have it in the mandatory part when explicit signaling is decided in step 712. This is to make sure that the parser or player can find the information.

In another alternative embodiment, additional signaling in the specific track group type box for the spatial relationship description is defined in a way that it preserves backward compatibility with older versions of spatial relationship description in ISOBMFF or OMAF. For that, a new version of the TrackGroupTypeBox is defined, for example version=1 or the same version=0 but with flags value. It is to be noted that TrackGroupTypeBox in prior art does not allow flags value. Providing the TrackGroupTypeBox with flags value is part of this embodiment of the invention.

A flag value "Reference_info_is_present" set for example to the value 0x01, may be defined to indicate that this track group contains information on a reference picture to consider for position and sizes of spatial relationship information. Then the 2dcc track group can be expressed as follows:

```
aligned(8) class SpatialRelationship2DDescriptionBox extends
TrackGroupTypeBox('2dcc', 0, flags)
{
    // track_group_id is inherited from TrackGroupTypeBox;
    SpatialRelationship2DSourceBox(flags);  // mandatory, must be first
    SubPictureRegionBox ( );                // optional
``` total_width and total_height respectively indicate the width and the height of the projected picture.

Using the flags reduces the description cost of each sub picture track when there is no ambiguity on the reference picture, for example for a 2D classical video. Using the flags to indicate the presence or absence of a reference picture allows reusing the 2dcc track grouping type to handle both cases of splitting an omnidirectional content into sub-picture tracks: with or without the region wise packing step.

In yet another embodiment, the flags parameter of the TrackGroupingTypeBox, or of one of its inheriting boxes like SpatialRelationship2DDescriptionBox, is used to provide the reference picture directly in the flags value. For example when the flags parameter has the least significant bit set to 0, this means that the reference picture is the projected picture in case of omnidirectional video. When the flags parameter has its least significant bit set to 1, then it means that the reference picture is the packed picture in case of omnidirectional video. The default value is the least significant bit of the flags parameter set to 0. With this embodiment, there is no additional parameter in the SpatialRelationship2DSourceBox, which makes the file description more compact (saving 4 bytes per sub-picture track).

In an alternative embodiment, the distinction between implicit or explicit sub-picture tracks signaling is done by using two different tracks grouping types. The current grouping type is used for implicit signaling, a new track grouping type is defined for explicit spatial relationship track group. For example the four character code 'edcc' is used and a new TrackGroupingTypeBox is created as follows:

```
aligned(8) class ExplicitSpatialRelationship2DDescriptionBox extends
TrackGroupTypeBox('edcc', 0, flags)
{
    // track_group_id is inherited from TrackGroupTypeBox;
    ExplicitSpatialRelationship2DSourceBox(flags);    // mandatory, must be first
    SubPictureRegionBox ( );                          // optional
}
aligned(8) class ExplicitSpatialRelationship2DSourceBox    extends
FullBox('edsr', 0, flags) {
    unsigned int(32) total_width;
    unsigned int(32) total_height;
    unsigned int(32) source_id;
    unsigned int(8) reference_picture;
}
```

-continued

```
}
aligned(8) class SpatialRelationship2DSourceBox    extends
FullBox('2dsr', 0, flags) {
    unsigned int(32) total_width;
    unsigned int(32) total_height;
    unsigned int(32) source_id;
    if ( (flags & 0x01) == 1) {
        unsigned int(1) reference_picture;
        unsigned int(31) reserved
    }
}
``` where reference_picture is a new parameter that when taking value "0" indicates that the positions for the sub picture tracks in this group are expressed in the projected picture coordinate system. The name of the parameter is given as an example. As well, the When the encapsulation configuration is determined to be "implicit", (test 801 and 802 false) meaning that no specific signaling is used, the parser goes into implicit determination of the reference picture. It consists by parsing the schemes declared in the restricted information box 'rinf' which transformation or post-decoding operations have to be performed and potentially provide reference picture. Most of the time for OMAF, it can be a packed picture or the projected picture. For stereoscopic content, it may also be the frame packed picture. The parser then checks the presence of OMAF descriptors to determine the candidate reference pictures. The parser assumes that the positions and sizes parameters for the spatial relationship description are expressed with respect to the projected picture when there is no region-wise packing indication in the media file (test 810 false). When a region-wise packing box is present, the positions and sizes parameters for the spatial relationship description are expressed with respect to the packed picture (step 811). Optionally the parser may consider presence or absence of the frame-packed picture by testing for the presence of a stvi box in the sub-picture tracks of the track group describing the spatial relationship (step 808). If present, the parser records the frame-packed picture as a candidate reference picture. More generally, for the implicit signaling, the positions and sizes of the sub-picture tracks are considered expressed in the last picture resulting from the different processing steps between the capture 110 and the encoding 140. These different processing are reflected in the restricted scheme information box 'rinf'. For example, when the content preparation contains projection 120, frame packing 125 and region-wise packing 130, the RestrictedSchemeInfoBox 'rinf' box contains in its SchemeTypeBox a 'povd' box indicating that a projection has been applied. This 'povd' box may itself contain a structure describing the region wise packing done at 130, for example as a RegionWisePackingBox 'rwpk'. As well, a stereo video box is present, for example in a CompatibleSchemeTypeBox, to indicate the frame packing used in step 125.

For optimized implicit mode and in closed systems, encapsulation and parser may exchange configuration information or define settings to declare a pre-defined default mode for sub-picture track description. For example, they may agree that sub-picture tracks always reference the projected image when the media contains omnidirectional content.

Figure 9:
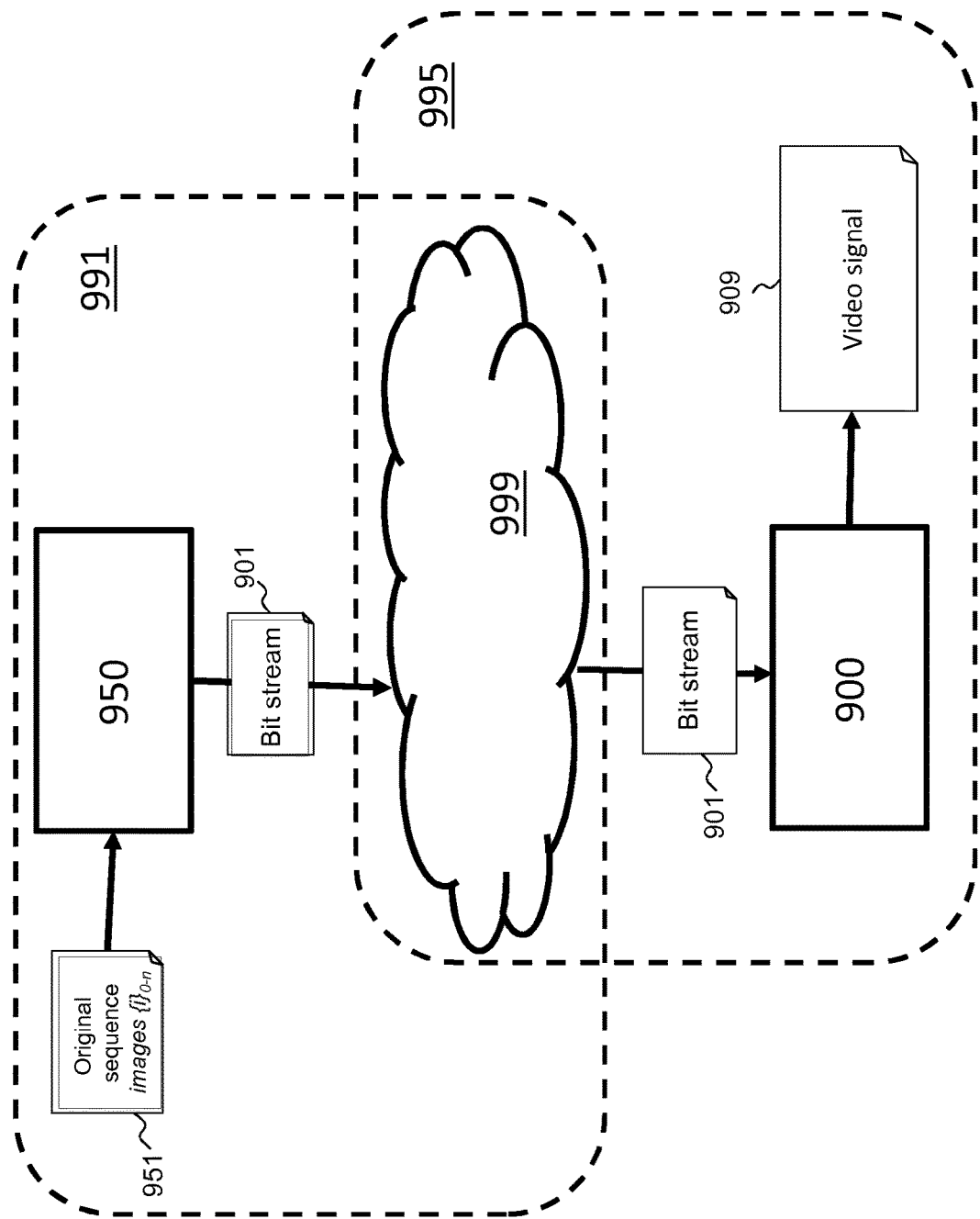
FIG. 9 illustrates a system according to embodiments of the present invention.

FIG. 9 illustrates a system 991 995 comprising at least one of an encoder 950 or a decoder 900 and a communication network 999 according to embodiments of the present invention. According to an embodiment, the system 995 is for processing and providing a content (for example, a video and audio content for displaying/outputting or streaming video/audio content) to a user, who has access to the decoder 900, for example through a user interface of a user terminal comprising the decoder 900 or a user terminal that is communicable with the decoder 900. Such a user terminal may be a computer, a mobile phone, a tablet or any other type of a device capable of providing/displaying the (provided/streamed) content to the user. The system 995 obtains/receives a bitstream 901 (in the form of a continuous stream or a signal—e.g. while earlier video/audio are being displayed/output) via the communication network 999. According to an embodiment, the system 991 is for processing a content and storing the processed content, for example a video and audio content processed for displaying/outputting/streaming at a later time. The system 991 obtains/receives a content comprising an original sequence of images 951, for example corresponding to a wide view scene in embodiments of the invention, which is received and processed by the encoder 950, and the encoder 950 generates a bitstream 901 that is to be communicated to the decoder 900 via a communication network 991. The bitstream 901 is then communicated to the decoder 900 in a number of ways, for example it may be generated in advance by the encoder 950 and stored as data in a storage apparatus in the communication network 999 (e.g. on a server or a cloud storage) until a user requests the content (i.e. the bitstream data) from the storage apparatus, at which point the data is communicated/streamed to the decoder 900 from the storage apparatus. The system 991 may also comprise a content providing apparatus for providing/streaming, to the user (e.g. by communicating data for a user interface to be displayed on a user terminal), content information for the content stored in the storage apparatus (e.g. the title of the content and other meta/storage location data for identifying, selecting and requesting the content), and for receiving and processing a user request for a content so that the requested content can be delivered/streamed from the storage apparatus to the user terminal. Advantageously, in embodiments of the invention, the user terminal is a head mounted display. Alternatively, the encoder 950 generates the bitstream 901 and communicates/streams it directly to the decoder 900 as and when the user requests the content. The decoder 900 then receives the bitstream 901 (or a signal) and performs the decoding of the sub-picture tracks according to the invention to obtain/generate a video signal 909 and/or audio signal, which is then used by a user terminal to provide the requested content to the user.

Figure 3:
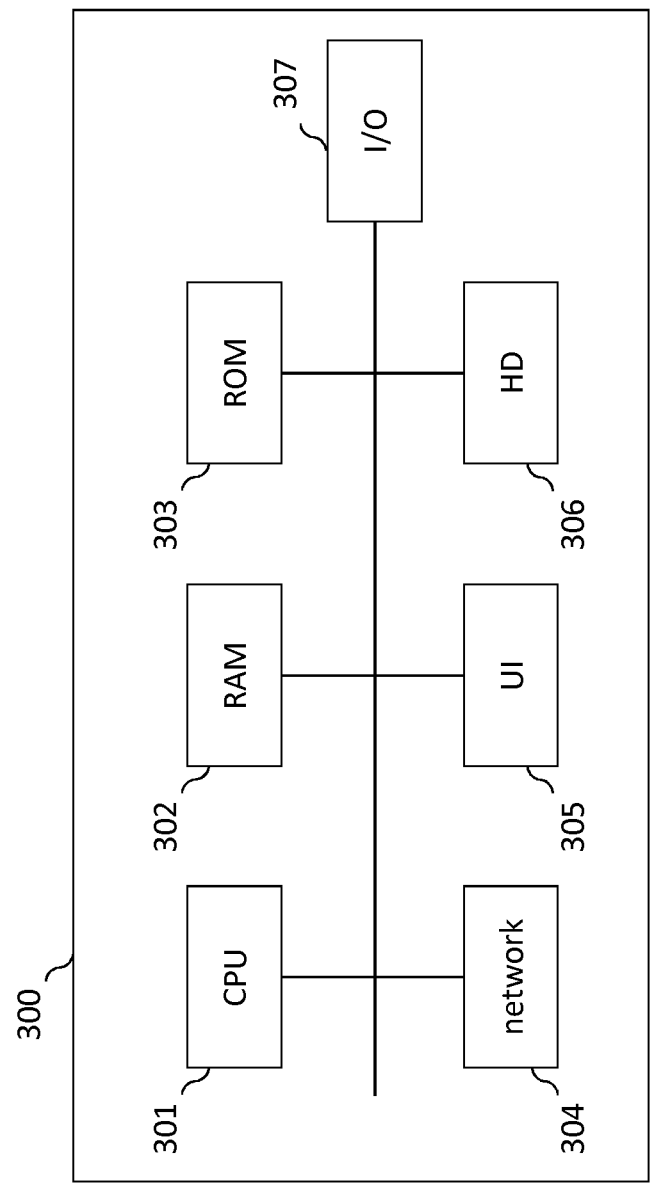
FIG. 3 is a schematic block diagram of a computing device for implementation of one or more embodiments of the invention.

FIG. 3 is a schematic block diagram of a computing device 300 for implementation of one or more embodiments of the invention. The computing device 300 may be a device such as a micro-computer, a workstation or a light portable device. The computing device 300 comprises a communication bus connected to:

- a central processing unit (CPU) 301, such as a microprocessor;
- a random access memory (RAM) 302 for storing the executable code of the method of embodiments of the invention as well as the registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
- a read only memory (ROM) 303 for storing computer programs for implementing embodiments of the invention;
- a network interface 304 that is, in turn, typically connected to a communication network over which digital data to be processed are transmitted or received. The network interface 304 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 301;
- a user interface (UI) 305 for receiving inputs from a user or to display information to a user;
- a hard disk (HD) 306;
- an I/O module 307 for receiving/sending data from/to external devices such as a video source or display.

The executable code may be stored either in read only memory 303, on the hard disk 306 or on a removable digital medium such as for example a disk. According to a variant, the executable code of the programs can be received by means of a communication network, via the network interface 304, in order to be stored in one of the storage means of the communication device 300, such as the hard disk 306, before being executed.

The central processing unit 301 is adapted to control and direct the execution of the instructions or portions of software code of the program or programs according to embodiments of the invention, which instructions are stored in one of the aforementioned storage means. After powering on, the CPU 301 is capable of executing instructions from main RAM memory 302 relating to a software application after those instructions have been loaded from the program ROM 303 or the hard-disc (HD) 306 for example. Such a software application, when executed by the CPU 301, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

For example, the present invention may be embedded in a device like a camera, a smartphone, a head-mounted display or a tablet that acts as a remote controller for a TV or for multimedia display, for example to zoom in onto a particular region of interest. It can also be used from the same devices to have personalized browsing experience of a multimedia presentation by selecting specific areas of interest. Another usage from these devices and methods by a user is to share with other connected devices some selected sub-parts of his preferred videos. It can also be used with a smartphone or tablet to monitor what happens in a specific area of a building put under surveillance provided that the surveillance camera supports the method for providing data according to the invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A method for encapsulating media data in a file format compatible with ISO BMFF, the media data corresponding to a wide view of a scene, the wide view resulting from a projection of images of the scene onto at least a part of a sphere, the method comprising:
   obtaining a two-dimensional projected picture from the wide view of the scene, the two-dimensional projected picture resulting from a projection of the wide view onto a plane;
   splitting the two-dimensional projected picture into a plurality of sub-pictures;
   encapsulating the plurality of sub-pictures into a plurality of tracks;
   generating descriptive metadata associated with the encapsulated tracks, the descriptive metadata comprises a track group type box associated with each track being indicative of a two-dimensional spatial relationship between the plurality of sub-pictures encapsulated in the track and a composition picture, the composition picture resulting from a composition of each of the sub-pictures of the plurality of tracks, the plurality of tracks belonging to a same group of tracks;
   wherein the track group type box further comprises information for indicating whether the composition picture is a region-wise packed picture or not, the information being used to determine whether parsing of a region-wise packing box is to be performed or not, the region-wise packed picture being obtained by applying an operation to the two-dimensional projected picture.

2. The method of claim 1, wherein the region-wise packed picture is obtained by packing the two-dimensional projected picture resulting from the projection into a packed picture and splitting the packed picture into a plurality of sub-pictures.

3. The method of claim 1, wherein the information indicates whether the composition picture is the region-wise packed picture or not by a four-character code.

4. The method of claim 1, wherein the information is defined as a parameter of the track group type box.

5. The method of claim 1, wherein the information is defined as a specific type of group information used to describe the properties of a group of tracks corresponding to sub-pictures.

6. A non-transitory computer-readable storage medium storing instructions of a computer program for implementing a method according to claim 1.

7. The method of claim 1, wherein the operation includes transformation, resizing, or relocating regions of two-dimensional projected image.

8. A method for generating at least one image from a media file in a file format compatible with ISO BMFF, comprising a plurality of encapsulated tracks and associated descriptive metadata, the method comprising:
   determining that the plurality of encapsulated tracks comprise a group of tracks encoding a plurality of sub-pictures resulting from the splitting of a two-dimensional projected picture resulting from a projection of a wide view of a scene onto a plane, the wide view resulting from a projection of images of the scene onto at least a part of a sphere;
   parsing descriptive metadata associated with the group of tracks;
   wherein parsing descriptive metadata associated with the group of tracks comprises:
   interpreting a track group type box associated with each track being indicative of a two-dimensional spatial relationship between the plurality of sub-pictures encapsulated in the track and the at least one composition picture, the composition picture resulting from a composition of each of the sub-pictures of the plurality of tracks, the plurality of tracks belonging to a same group of tracks; and
   interpreting information in the track group type box indicating whether the composition picture is a region-wise packed picture or not, the information being used to determine whether parsing of a region-wise packing box is to be performed or not, the region-wised packed picture being obtained by applying an operation to the two-dimensional projected picture.

9. The method of claim 8, wherein the region-wise packed picture is obtained by packing the two-dimensional projected picture resulting from the projection into a packed picture and splitting the packed picture into a plurality of sub-pictures.

10. The method of claim 8, wherein the information indicates whether the composition picture is the region-wise packed picture or not by a four-character code.

11. The method of claim 8, wherein the information is defined as a parameter of the track group type box.

12. The method of claim 8, wherein the information is defined as a specific type of group information used to describe the properties of a group of tracks corresponding to sub-pictures.

13. The method of claim 8, wherein the operation includes transformation, resizing, or relocating regions of two-dimensional projected image.

14. A computing device for encapsulating media data in a file format compatible with ISO BMFF, the media data corresponding to a wide view of a scene, the wide view resulting from a projection of images of the scene onto at least a part of a sphere, the computing device being configured for:

obtaining a two-dimensional projected picture from the wide view of the scene, the two-dimensional projected picture resulting from a projection of the wide view onto a plane;

splitting the two-dimensional projected picture into a plurality of at least one sub-pictures;

encapsulating the plurality of sub-pictures into a plurality of tracks;

generating descriptive metadata associated with the encapsulated tracks, the descriptive metadata comprise a track group type box associated with each track being indicative of a two-dimensional spatial relationship between the plurality of sub-pictures encapsulated in the track and a composition picture, the composition picture resulting from a composition of each of the sub-pictures of the plurality of tracks, the plurality of tracks belonging to a same group of tracks;

wherein the track group type box further comprises information indicating whether the composition picture is a region-wise packed picture or not, the information being used to determine whether parsing of a region-wise packing box is to be performed or not, the region-wise packed picture being obtained by applying an operation to the two-dimensional projected picture.

15. A computing device for generating at least one image from a media file in a file format compatible with ISO BMFF, comprising a plurality of encapsulated tracks and associated descriptive metadata, the computing device being configured for:

determining that the plurality of encapsulated tracks comprise a group of tracks encoding a plurality of sub-pictures resulting from the splitting of a two-dimensional projected picture resulting from a projection of a wide view of a scene onto a plane, the wide view resulting from a projection of images of the scene onto at least a part of a sphere;

parsing descriptive metadata associated with the group of tracks;

wherein parsing descriptive metadata associated with the group of tracks comprises:

interpreting a track group type box associated with each track being indicative of a two-dimensional spatial relationship between the plurality of sub-pictures encapsulated in the track and the at least one composition picture, the composition picture resulting from a composition of each of the sub-pictures of the plurality of tracks, the plurality of tracks belonging to a same group of tracks; and interpreting information in the track group type box indicating whether the composition picture is a region-wise packed picture or not, the information being used to determine whether parsing of a region-wise packing box is to be performed or not, the region-wise packed picture being obtained by applying an operation to the two-dimensional projected picture.

\* \* \* \* \*